US 12,189,843 B2

(12) United States Patent
Le Chevalier

(10) Patent No.: US 12,189,843 B2
(45) Date of Patent: Jan. 7, 2025

(54) DESCRIBING CONTENT ENTITIES FOR VISUALLY IMPAIRED USERS OF AUGMENTED REALITY APPLICATIONS

(71) Applicant: Chegg, Inc., Santa Clara, CA (US)

(72) Inventor: Vincent Le Chevalier, Waikoloa, HI (US)

(73) Assignee: Chegg, Inc., Santa Clara, CA (US)

( * ) Notice: Subject to any disclaimer, the term of this patent is extended or adjusted under 35 U.S.C. 154(b) by 160 days.

(21) Appl. No.: 17/961,614

(22) Filed: Oct. 7, 2022

(65) Prior Publication Data
US 2024/0118745 A1   Apr. 11, 2024

(51) Int. Cl.
| | |
|---|---|
| G06F 3/01 | (2006.01) |
| G06T 19/00 | (2011.01) |
| G09B 21/00 | (2006.01) |

(52) U.S. Cl.
CPC ............ *G06F 3/013* (2013.01); *G06T 19/006* (2013.01); *G09B 21/008* (2013.01)

(58) Field of Classification Search
CPC ...... G06F 3/013; G06T 19/006; G09B 21/008
See application file for complete search history.

(56) References Cited

U.S. PATENT DOCUMENTS

| | | | | |
|---|---|---|---|---|
| 2007/0050191 A1* | 3/2007 | Weider | ................. | G06F 16/951 |
| | | | | 704/E15.04 |
| 2010/0057566 A1* | 3/2010 | Itzhak | ................ | G06Q 30/0273 |
| | | | | 705/14.69 |
| 2017/0115742 A1* | 4/2017 | Xing | ..................... | G06F 3/0485 |
| 2018/0129188 A1* | 5/2018 | Jacobs, II | .......... | G05B 19/4093 |
| 2019/0212901 A1* | 7/2019 | Garrison | ............... | G06F 3/1454 |
| 2020/0213632 A1* | 7/2020 | Goldberg | ............. | H04N 21/235 |
| 2021/0104169 A1* | 4/2021 | Si | ............................ | G06T 11/00 |
| 2022/0301192 A1* | 9/2022 | Boardman | .............. | G06T 7/579 |

* cited by examiner

*Primary Examiner* — Grace Q Li
(74) *Attorney, Agent, or Firm* — Sheppard Mullin Richter & Hampton LLP

(57) ABSTRACT

Methods, systems, and apparatus, including computer programs encoded on computer storage media, for assisting a visually impaired user in interacting with a visual content entity are provided. One of the methods includes capturing, by an augmented reality device worn or held by the visually impaired user, a plurality of images of the visual content entity; notifying the visually impaired user of availability of the visual content entity and descriptive content associated with the visual content entity; receiving an indication from the visually impaired user to provide the descriptive content associated with the visual content entity; providing the descriptive content associated with the visual content entity and interactional guidance to the visually impaired user for interacting with the descriptive content; tracking one or more interactions by the visually impaired user with the descriptive content; and updating the interactional guidance provided to the visually impaired user based on the tracking.

20 Claims, 13 Drawing Sheets

DESCRIBING CONTENT ENTITIES FOR VISUALLY IMPAIRED USERS OF AUGMENTED REALITY APPLICATIONS

BACKGROUND

According to estimates from the 2018 National Health Interview Survey, 32.2 million American Adults reported experiencing vision loss. The term vision loss refers to individuals who reported that they have trouble seeing, even when wearing glasses or contact lenses, as well as to individuals who reported that they are blind or unable to see at all. This estimate pertains to a nationally representative sample of the non-institutionalized civilian population 18 years of age and over.

Of these 32.2 million American adults who reported experiencing vision loss, 13.7 million are males and 18.5 million are females. With regards to age, 23.0 million of the 32.2 million American adults who reported experiencing vision loss are between the ages of 18 and 64, and the remaining 9.2 million American adults are 65 years and older. Americans with vision loss report the following racial identities: Approximately 24.7 million Americans with vision loss are white, 4.8 million Americans with vision loss are black or African American, 1.4 million Americans with vision loss are Asian, and 622,000 Americans with vision loss are American Indian or Alaska Native. 759,000 Americans with vision loss indicated other multiple or other races.

Of the Americans who have vision loss and are 25 years of age and over, 4.7 million have less than a high school diploma, 8.1 million have a high school diploma or a GED (but no further), 9.2 million have some college education but not a bachelor's degree, and 7.5 million have a bachelor's degree or higher.

Students who are visually impaired are fully capable of achieving everything their sighted peers are. The challenge is that America's public education system doesn't have enough qualified instructors and resources to address the full array of these students' needs. Providing appropriate instruction and resources for students who are visually impaired would vastly improve their educational development, lifelong employment, and independence outcomes.

Instructional materials, technologies, teaching methods, and every facet of grades K-12 and post-secondary education should honor the unique needs and capabilities of individuals who are blind or visually impaired. However, barriers still exist that create challenges to visually impaired students and their teachers. For example, content printed on tangible media such as books are often not made accessible to visually impaired students. While online or digital content are more often made accessible to visually impaired students, it remains challenging to create and include audio descriptions for elements like pictures or graphs. Students are unable to learn with graphical content or take a test that includes such content if they don't know what is being presented.

Web accessibility efforts such as alternative text (Alt-Text) have a long way to go before supporting large scale education services. Techniques for web accessibility often require content creators and developers manually entering limited text descriptions which can be read by Browsers and eReaders. But this process is not automated and doesn't provide the tools to determine and guide a visually impaired person on the actual shape and contour of the image or its associated content layers. Furthermore, these prior techniques only apply to previously digitized and enhanced content entity, preventing the accessibility of content on tangible media.

TECHNICAL FIELD

The specification relates generally to augmented reality and more particularly, but not by way of limitation, to systems and methods of augmented reality for creating and processing interactive content for visual impaired users.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In some embodiments, a method for assisting a visually impaired user in interacting with a visual content entity may be performed by an augmented reality (AR) device worn or held by a visually impaired user. The method also includes capturing a plurality of images of a visual content entity using the AR device. The method further includes notifying, via the AR device, the visually impaired user of the availability of the visual content entity and descriptive content associated with the visual content entity. The method also includes receiving, via the AR device, an indication from the visually impaired user to provide the descriptive content associated with the visual content entity. The method further includes providing the descriptive content associated with the visual content entity and interactional guidance to the visually impaired user for interacting with the descriptive content. The method also includes tracking, via the augmented reality device, one or more interactions by the visually impaired user with the descriptive content. The method further includes updating the interactional guidance provided to the visually impaired user based on the tracking.

In some embodiments, updating the interactional guidance provided to the visually impaired user based on the tracking comprises: monitoring, via the augmented reality device, spatial locations of an object associated with the visually impaired user; determining whether the monitored spatial locations track one or more spatial locations associated with one or more components of the visual content entity; and delivering one or more audio outputs to the visually impaired user, wherein the one or more audio outputs comprises one or more directions for moving the object associated with the visually impaired user. Here, the object associated with the visually impaired user may comprise a part of the user's body (e.g., the user's finger) or an object held or worn by the user (e.g., a stylus in the user's hand).

In some embodiments, the descriptive content associated with the visual content entity comprises a plurality of content layers; and the providing the descriptive content associated with the visual content entity and interactional guidance to the visually impaired user for interacting with the descriptive content comprises: selecting a first content layer from the plurality of content layers based on an audio input from the visually impaired user, and delivering one or more audio outputs corresponding to the selected first content layer to the visually impaired user.

In some embodiments, capturing the plurality of images of the visual content entity comprises: capturing, by the augmented reality device, a plurality of first images of the visual content entity; determining a quality of the plurality of first images; and if the quality of the plurality of first images is less than a quality threshold, delivering one or more audio outputs instructing the visually impaired user to capture a plurality of second images of the visual content entity.

In some embodiments, the method further comprises, prior to the notifying: comparing the captured images with a plurality of reference images stored in a content entity database; determining if the captured images match at least one of the reference images; if the captured images match at least one of the reference images, obtaining the descriptive content of the matched reference image from the content entity database; and if the captured images do not match any one of the reference images, generating descriptive content associated with the visual content entity based on the captured images.

In some embodiments, the descriptive content comprises a plurality of content layers, the content layers comprising one or more of: the visual content entity; a composition layout layer; a content description layer; and a concept and supplemental content layer.

In some embodiments, the method further comprises generating the composition layout layer, wherein the generating comprises: extracting one or more composition sections of the visual content entity, each composition section comprising descriptive content elements associated with the visual content entity; determining a spatial location corresponding to each of the one or more extracted composition sections; ordering the one or more extracted composition sections based on the determined spatial location of each composition section; and including the spatial location corresponding to each extracted composition section in the composition layout layer.

In some embodiments, the method further comprises generating the content description layer, wherein the generating comprises: extracting text characters and graphics from the captured images of the visual content entity; identifying one or more terms from the extracted text characters; correlating the extracted graphics with one or more of the identified terms; retrieving one or more definitions of one or more identified terms from a knowledge database; and including the one or more identified terms, the extracted graphics, and the one or more retrieved definitions in the content description layer.

In some embodiments, the method further comprises generating the concept and supplemental content layer, wherein the generating comprises: extracting one or more content elements from the captured images of the visual content entity; searching a knowledge database to identify one or more concepts and supplemental content corresponding to the one or more extracted content elements; and structuring the one or more concepts and the supplemental content based on their correspondence with the one or more extracted content elements.

In some embodiments, a system (e.g., an AR content entities description system) may include a processor and memory. The processor and memory in combination are operable to implement a method. The memory stores instructions executable by the processor to cause the system to perform operations. The operations include capturing a plurality of images of the visual content entity using the AR device. The operations further include notifying the visually impaired user of the availability of the visual content entity and descriptive content associated with the visual content entity. The operations also include receiving an indication from the visually impaired user to provide the descriptive content associated with the visual content entity. The operations further include providing the descriptive content associated with the visual content entity and interactional guidance to the visually impaired user for interacting with the descriptive content. The operations also include tracking one or more interactions by the visually impaired user with the descriptive content. The operations further include updating the interactional guidance provided to the visually impaired user based on the tracking.

In an embodiment, another general aspect includes a computer-program product that further includes a non-transitory computer-readable medium having computer-readable program code embodied therein. The non-transitory computer-readable medium may be embodied on an AR device. The computer-readable program code is adapted to be executed to implement a method. The computer-readable program code is configured with instructions executable by one or more processors to cause the one or more processors to perform operations. The operations include capturing a plurality of images of the visual content entity using the AR device. The operations further include notifying, via the AR device, the visually impaired user of the availability of the visual content entity and descriptive content associated with the visual content entity. The operations also include receiving, via the AR device, an indication from the visually impaired user to provide the descriptive content associated with the visual content entity. The operations further include providing the descriptive content associated with the visual content entity and interactional guidance to the visually impaired user for interacting with the descriptive content. The operations also include tracking, via the augmented reality device, one or more interactions by the visually impaired user with the descriptive content. The operations further include updating the interactional guidance provided to the visually impaired user based on the tracking.

Embodiments disclosed herein provide various technical advantages. For example, embodiments herein use the video input capabilities of an AR device to capture images of content interacted with by a visually impaired user. The AR device, by itself or though a backend system, processes the captured content and associated it with one or more layers of descriptive content. The AR device may then provide guidance to the user by detecting the position of the user's finger or an object held by the user and provide audio- or touch-based feedback to the user. In this manner, embodiments disclosed herein leverages an AR device's sensor functionalities and multimedia processing functionalities to assist a visually impaired user in understanding, navigating, and interacting with various types of content, tangible or digital, textual or graphical, two-dimensional (2D) or three-dimensional (3D).

BRIEF DESCRIPTION OF THE DRAWINGS

A more complete understanding of the method and apparatus of this disclosure may be obtained by reference to the following Detailed Description when taken in conjunction with the accompanying Drawings wherein.

Figure 1:
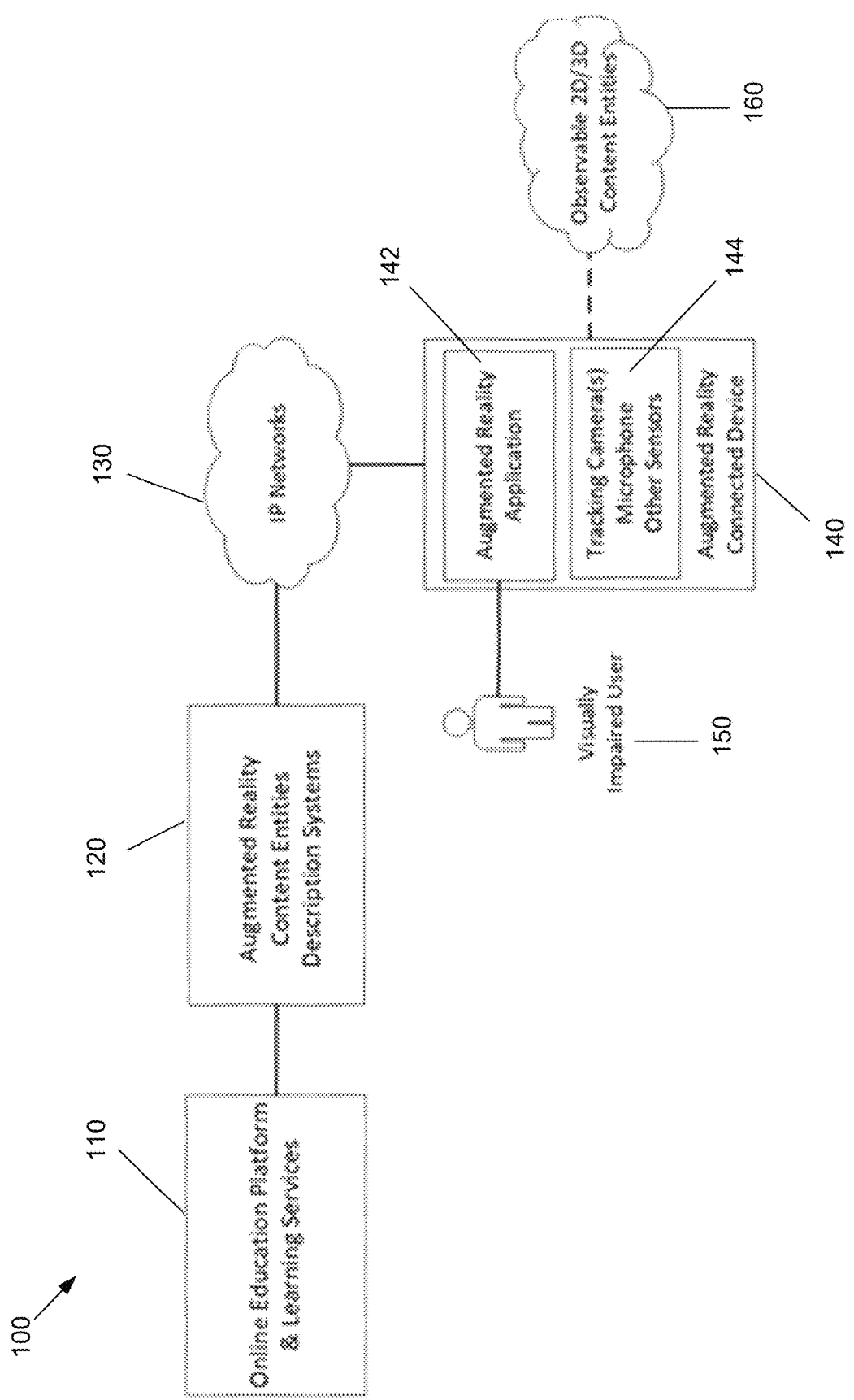
FIG. 1 illustrates an example computing environment of a content entities description system for creating interactive augmented reality content entities.

The figures are not exhaustive and do not limit this disclosure to the precise form disclosed.

DETAILED DESCRIPTION

A visually impaired person may have difficulty understanding the appearance and properties of a content entity without assistance. Using an augmented reality system, a visually impaired person may use a finger or pen, as a virtual stylus, to trace the spatial coordinate of key content elements of an observable content entity, such as 2D printed pages of a document or 3D objects. The augmented reality system and its applications may provide a real-time feedback loop that enables the visually impaired person to construct a virtual representation of the key elements of the content entity without being able to see it and to correlate that virtual representation with any associated descriptive content through active conversation layers. The augmented reality system may then allow the visually impaired person to understand how a content entity looks like by grasping the virtual representation to know how it feels and is shaped while describing its properties.

The augmented reality system may further provide new tools to visually impaired persons in their understanding of academic content services which have not been originally designed for people with similar disabilities. The augmented reality system may also introduce services outside of the educational domain by generalizing how any content entity can be represented and described to visually impaired persons who have access to the augment reality system and its applications.

A visually impaired person may have access to the augmented reality system and its applications by wearing an augmented reality device that is connected to back-end systems over a network to allow for the processing of content entities for interactive content services. As an example, the front camera(s) of an augmented reality device worn or held by a visually impaired person may be used to capture images of 2D or 3D content entities that are in view of the front camera(s). The 2D and/or 3D visual content entities may be objects and/or images that the visually impaired person would like to perceive or understand. As an example, a visual content entity may be an apple on a table, a photograph of an apple in a textbook, or a digital image of an apple. The augmented reality system may then assist in explaining and describing how the 2D or 3D content entities look, guide the visually impaired person in creating a visual of the 2D or 3D content entities, and allowing the visually impaired person to interact with the visual representation of the content entities to better understand the properties and appearance of the content entities.

By having the visually impaired person using a finger or stylus to trace the main content elements of an object/printed document/picture presented to him/her, the augmented reality system and its applications may provide a feedback loop that guides the visually impaired person towards the spatial position of the key content elements as deconstructed by the augmented reality back-end systems. For example, the augmented reality system and its applications may guide the visually impaired person to follow the shape of an apple sitting on a desk. This type of virtual stylus tracker enables the visually impaired person to construct a mental representation of the key elements of an object/document/picture without being able to see it. It also provides the visually impaired person with an environment to learn and interact with multiple content layers that describe the content entity's composition, layout, content, concept, and other related content using conversational functions such as speech and voice commands.

The specification describes examples of systems and methods for assisting a visually impaired person in understanding, navigating, and interacting with 2D and 3D visual content entities. In some embodiments, a system may capture images of a visual content entity from an augmented reality device worn or held by a visually impaired person. The system may analyze the captured images of the visual content entity and generate or retrieve descriptive content for the visual content entity. Once the descriptive content of the visual content entity has been generated, the system may notify the visually impaired person of the availability of the descriptive content via the augmented reality device. As an example, the system may notify the visually impaired person by sending an audio signal, an audio message, vibrations and/or a physical pressure, such as a tap, to the visually impaired person. When the system receives an indication from the visually impaired person to provide the descriptive content of the visual content entity, the system may provide the descriptive content of the visual content entity to the visually impaired person. The system may further provide interactional guidance to the visually impaired person for the visually impaired person to interact with and navigate through the descriptive content. The system may monitor and track all of the visually impaired person's movements and interactions with the descriptive content via the augmented reality device, and update the interactional guidance according to the visually impaired person's movements. Examples will be described below.

FIG. 1 illustrates an example computing environment 100 of a content entities description system for creating interactive augmented reality content entities for a visually impaired person. The computing environment 100 includes an online education platform 110, an augmented reality (AR) content entities description system 120, internet protocol (IP) networks 130, and an AR connected device 140. Visually impaired user 150 may be any person who using and/or wearing the AR connected device 140, such as a visually impaired person. Observable 2D/3D content entities 160 may include any textbooks, documents, and images, either printed or digital, and any real life objects.

The online education platform 110 may include online learning services to persons, including students and professionals. The online learning services may include eTextbooks, Q&As, tutoring, guides, tests, and other learning materials. The online learning services available in the online education platform 110 may be personalized based on a user's profile. A profile may include activities, subjects, interests and other learning characteristics of a particular person.

The AR content entities description system 120 may include one or more systems to provide services from the online education platform 110 to the AR connected device 140. The one or more systems in the AR content entities description system 120 may be any type of computing device, including computer systems such as servers, data centers, desktops, laptops, tablets, smartphones, AR glasses or headsets, or wearable or body-borne computers, to name a few.

The AR connected device 140 may be any type of wearable device for visually impaired user 150. The AR connected device 140 may be registered to the visually impaired user 150. The AR connected device 140 may be a stand-alone unit or it may be paired with a mobile device, including a laptop, tablet, smartphone, AR glasses or headsets, or wearable or body-borne computers. The AR connected device 140 may be operated using any combination of hand gestures and/or voice recognition from a person wearing and/or using the AR connected device 140, such as visually impaired user 150.

The AR connected device 140 may include an AR application 142 and sensors 144. The AR application 142 may handle the automated decomposition of observable 2D/3D content entities 160. The 2D/3D content entities 160 may be objects and/or images that the visually impaired person wants to understand. As an example, a 2D/3D content entities 160 may be an apple on a table, a photograph of an apple in a textbook, or a digital image of an apple. The AR application 142 may handle all interactions with the visually impaired user 150, including voice, audio, and motion. The sensors 144 may include cameras, such as front cameras, microphones, speakers, liquid-crystal displays (LCDs), and motion sensors. Sensors 144 may be embedded or attached into the AR connected device 140.

The AR connected device 140 may include a network interface to establish a connection through IP networks 130 with the AR content entities description system 120. Once a connection through IP networks 130 has been established, the AR connected device 140 may receive any services from the AR content entities description system 120, and the AR content entities description system 120 may receive any requests for services from the AR connected device 140. The AR connected device 140 may use the AR application 142 to send requests for services to and receive any services from the AR content entities description system 120.

The IP networks 130 may be used to connect the AR content entities description system 120 to the AR connected device 140. The IP networks may include an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, AR connected device 140 can include (or communicate with) a wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. The AR connected device 140 may include any suitable network interface for any one or more of these IP networks 130, where appropriate.

Figure 2:
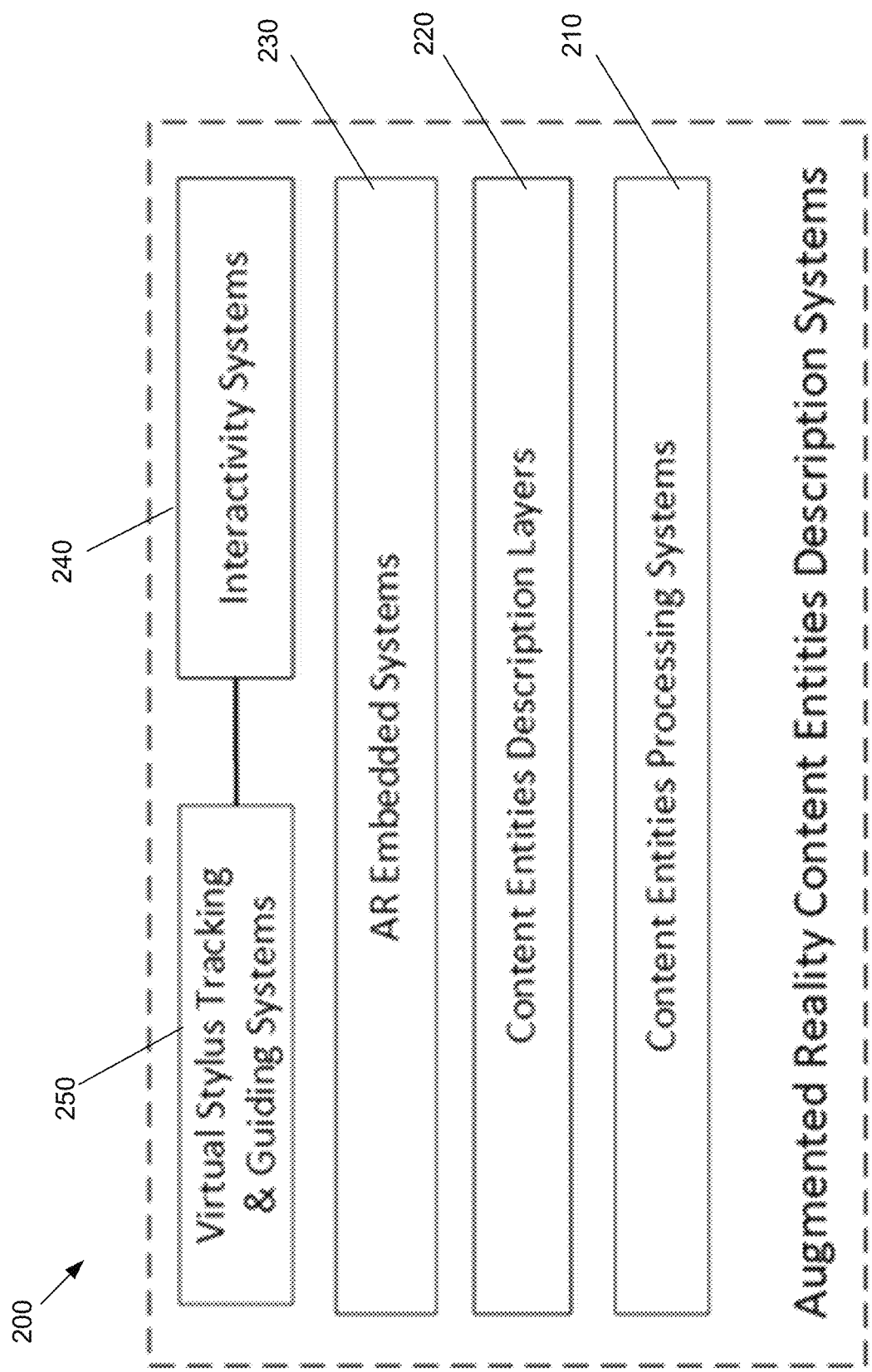
FIG. 2 illustrates example components of an augmented reality content entities description system comprising one or more components in accordance with some embodiments.

FIG. 2 illustrate example components (collectively 200) of a AR content entities description system comprising one or more components in accordance with some embodiments. The AR content entities description system 200 may be the AR content entities description system 120 in FIG. 1. The AR content entities description system 200 may include the components of a content entities processing system 210, a content entities description layer 220, an AR embedded systems 230, an interactivity system 240, and a virtual stylus tracking and guiding system 250, as shown in FIG. 2. FIG. 2 displays the main components that may be included in the AR content entities description system 200.

Figure 3:
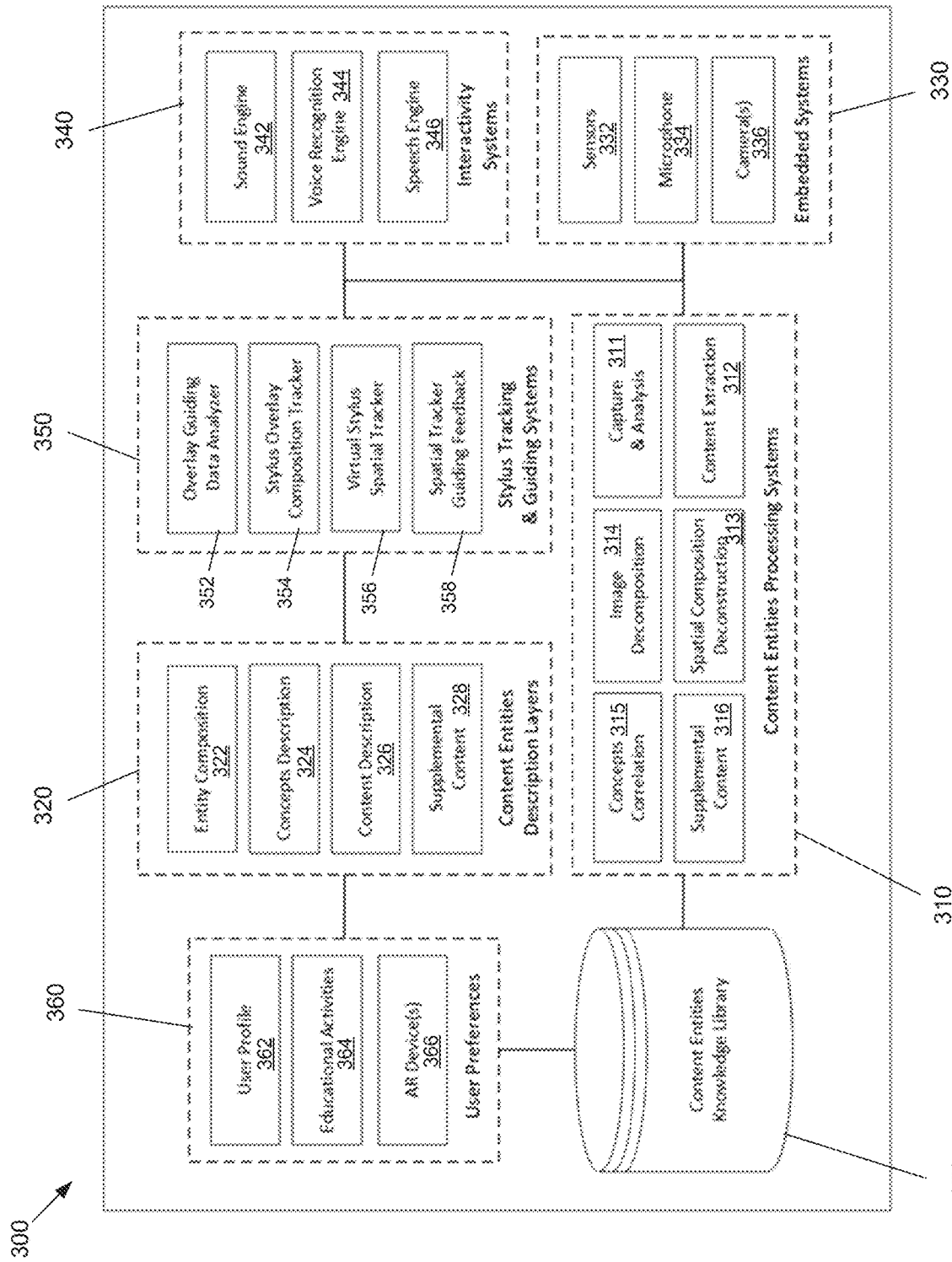
FIG. 3 illustrates example components of a content entities description system comprising one or more components in accordance with some embodiments.

FIG. 3 illustrates example components (collectively 300) of a content entities description system for creating interactive augmented reality content entities for a visually impaired person. The computing environment 300 may be the content entities description system. The content entities description system 300 may include the AR content entities description system 200 in FIG. 2. The content entities description system 300 may include components of a content entities processing system 310, a content entities description layer 320, an AR embedded systems 330, an interactivity system 340, a virtual stylus tracking and guiding system 350, user preferences 360, and a content entities knowledge library 370. The content entities processing system 310, content entities description layer 320, AR embedded systems 330, interactivity system 340 and virtual stylus tracking and guiding system 350 may respectively correspond to the content entities processing system 210, content entities description layer 220, AR embedded systems 230, interactivity system 240 and virtual stylus tracking and guiding system 250 of FIG. 2.

Each component of the content entities description system 300 may interconnect and communicate with one another. Each component of the content entities description system 300 may include one or more components and/or modules. The content entities description system 300 may be the content entities description system 100 of FIG. 1.

The content entities processing system 310 may include a capture & analysis module 311, a content extraction module 312, a spatial composition deconstruction module 313, an image decomposition module 314, a concepts correlation module 315, and a supplemental content module 316. The capture & analysis module 311 may instruct the AR embedded systems 330 to perform one or more operations. The AR embedded systems 330 may be the AR device being worn/ held and/or used by a visually impaired person, such as AR connected device 140. The AR embedded systems 330 may be the AR application, such as AR application 142, that is included in the AR connected device 140 being worn/held and/or used by a visually impaired person 150. The AR embedded systems 330 may include sensors 332, microphone 334, and camera(s) 336.

The capture & analysis module 311 may instruct the AR embedded systems 330 to capture images of observable content entities, such as observable 2D/3D content entities 160, using one or more cameras 336. The images captured by camera(s) 336 may be processed through one or more software, such as an image processing software. The software may normalize the captured images by correcting any possible issues, such as centering, aspect ratio, focus, lighting, and other imagery parameters. Normalization of the captured images may be performed before the images are analyzed.

After captured images have been normalized by one or more software, the capture & analysis module 311 may then perform operations of analyzing the observable 2D/3D content entities 160 displayed in the captured images. Operations may include determining and categorizing the observable 2D/3D content entities 160 as either a 2D or 3D content entity. For observable 2D/3D content entities 160 categorized as a 2D content entity, such as pages of a document for example, such a 2D content entity may be further analyzed by selecting the best normalized image amongst the captured images.

For observable 2D/3D content entities 160 categorized as 3D content entity, such as a real life object of an apple on a desk for example, such a 3D content entity may be further analyzed by determining the width, height, area, volume, and other characteristics of the 3D content entity. The capture & analysis module 311 may conduct such analysis of the 3D content entity by using one or more software. The capture & analysis module 311 may conduct such analysis of the 3D content entity by using the camera(s) 336 and sensors 332 of the AR embedded systems 330. For example, if the AR embedded systems 330 has two cameras positioned at different ends of a device, such as AR connected device 140, images captured by each camera may be compared to measure displacements between both viewpoints and pairing images taken from each camera at the same point in time to estimate characteristics of the 3D content entity, such as its depth.

The capture & analysis module 311 may further analyze all of the normalized captured images of the observable 2D/3D content entities 160 to determine their overall quality. The overall quality may be based on one or more factors, including composition, sharpness, light and exposure. If the overall quality of the normalized captured images are below an image quality threshold, then the capture & analysis module 311 may send instructions to the AR embedded systems 330 to capture more images of the observable 2D/3D content entities 160 using camera(s) 336. The instructions to capture more images may include direct feedback to the visually impaired person 150 wearing and/or using the AR embedded systems 330. The direct feedback may be provided to the visually impaired person 150 through microphone 334 of the AR embedded systems 330. The microphone 334 may include a microphone to obtain voice commands from the visually impaired user 150 and a speaker to provide audio to the visually impaired user 150. The direct feedback may be provided to the visually impaired person 150 via a device, such as a separate speaker, connected to the content entities description system 300. The direct feedback may include instructions of how to improve the quality of the captured images. For example, the direct feedback to the visually impaired user 150 may include instructions to change the lighting conditions and adjust the position of the observable 2D/3D content entities 160 before taking new photos of the observable 2D/3D content entities 160 using camera(s) 336. Any interactions between the visually impaired user 150 and the AR embedded systems 330 are performed through speech and voice commands through the microphone 334 and sound engine 342.

The content extraction module 312 of the content entities processing system 310 may extract the content elements, such as text elements and graphical elements, embedded in the normalized captured images of the observable 2D/3D content entities 160. Techniques, such as optical character recognition (OCR), may be applied by the content extraction module 312 to extract individual text characters from the normalized captured images of the observable 2D/3D content entities 160 and coalesced such individual text characters into words, sentences, and paragraphs.

As text characters are extracted and coalesced by the content extraction module 312, the content extraction module 312 may also provide instruction to the content entities knowledge library 370 to search one or more library databases for files and information of 2D and/or 3D content entities similar to the observable 2D/3D content entities 160 stored. The content entities knowledge library 370 may be the online education platform 110 of FIG. 1. The files and information of 2D and 3D content entities stored in the library databases of the content entities knowledge library 370 may include images, extracted content elements, and additional information of 2D and 3D content entities that have previously been analyzed. All 2D and 3D content entities stored in the library databases may be previously analyzed and deconstructed before being stored.

For example, the OCR technique may perform an extraction of a string of consecutive text characters that are collectively forming multiple words as presented in a single line of text within a particular 2D content entity of a page of a document. Using the string of text characters, the content extraction module 312 may filter out pages and documents of 2D content entities, stored in the library databases of the content entities knowledge library 370, that do not include that particular string. When the string is unique, it may lead to the identification of a single page, its related document and associated content within the entire content entities knowledge library 370 that is the same or very similar to the observable 2D/3D content entities 160. If the string is not unique, the correlation of a longer string, or alternatively the correlation of a second string of consecutive text characters and/or graphical characters at a different spatial location within the same particular observable 2D/3D content entities 160, may help with filtering out any possible duplicates, resulting in finding all corresponding documentation and data of content entities, that are the same or very similar to the observable 2D/3D content entities 160, stored in the library databases of the content entities knowledge library 370.

Further, techniques, such as OCR, may be applied to captions of graphical elements of an observable 2D/3D content entities 160 to help identify such graphical elements. The content extraction module 312 may use the captions to filter through the data stored in the content entities knowledge library 370. For example, such captions may include "figure," "diagram," or "image." The presence of a caption in the stored information of a 2D or 3D content entity may indicate that a graphical element is embedded into the particular content entity. The location of the caption may also be used to determine the spatial location of a graphical element within a content entity and any text elements that may be associated with the graphical element. Using a combination of text and graphical characters of the observable 2D/3D content entities 160 may allow for better results with searching for data and information of the same or similar 2D or 3D content entities stored in the content entities knowledge library 370.

The content extraction module 312 may index and structure the extracted text characters, along with any files and information associated with similar content entities stored in knowledge library 370, in the content description layer 326 in the content entities description layer component 320 of the AR content entities description system.

The spatial composition deconstruction module 313 of the content entities processing system 310 may deconstruct the captured observable 2D/3D content entities 160 into a composition layer using the normalized captured images. Deconstructing a captured image of a content entity into a composition layer may determine the spatial location of the content elements of the captured content entity. The content elements of the captured content entity may include text characters, graphical characters, paragraphs, columns, headers, and captions. The spatial composition deconstruction module 313 may provide a mental representation of the content entity with all of its content elements in the correct spatial location.

The spatial composition deconstruction module 313 may use techniques, such as principal components analysis (PCA) algorithm, linear discriminant analysis (LDA) or OCR algorithm, either alone or in combination, to deconstruct the captured images of the observable 2D/3D content entities 160 into a composition layout layer. The technique that is used may depend on the concept of vectors and linear transformations for the content entity. In some embodiments, vectors may be represented as arrows that have length, magnitude, and direction. Once a set of coordinates of the spatial location of content elements is established, a vector may be described relative to that set of coordinates by a sequence of numbers. A linear transformation may be used and described by a square matrix.

In one embodiment, the PCA algorithm may be used to reduce the dimension of the data of the captured image(s) of a content entity. The dimension of the data may be reduced by means of data compression basics. The dimension of the data may be reduced to the most effective low dimensional structure of the content entity. This reduction in dimensions may remove information data from the content entity that is not useful or necessary. The reduction may deconstruct the normalized images of the content entity into orthogonal (uncorrelated) components that are specific to the content entity's layout or plane. The outcome of the process may result in a specific list of components that are stored into a 1D array.

In another embodiment, the LDA algorithm may pre-filter the normalized images of the content entity prior to applying the normalized images to the PCA algorithm. The LDA algorithm may be a statistical approach for classifying samples of unknown classes of content entities and content elements based on training samples of known classes of content entities and content elements. This pre-filtering process may aim to maximize class variance across multiple pages of a content entity and minimize class variance within content elements within the same page of a content entity. In another embodiment, OCR algorithm may be applied to the decomposition of the 2D and/or 3D content entities, based on real-time computer vision.

The spatial composition deconstruction module 313 may index and structure the composition layout layer, along with all spatial location determinations of the content elements of the content entity, in the entity composition layer 322 in the content entities description layer component 320 of the AR content entities description system.

The image decomposition module 314 of the content entities processing system 310 may decompose any graphical content elements from the captured and normalized images of an observable 2D/3D content entity 160. A graphical element may be decomposed as a series of wireframes based on the defined shapes and contours of the graphical element. The set of wireframes may be displayed as dotted lines following the shape and contour of the key elements of the graphical element.

Each dotted line may be made of multiple regularly distributed dots defined by their 2D/3D spatial location in relation to each defined shape and contour of a graphical element. The dotted lines may be constructed using a generic set of geometric shapes, such as triangle, rectangle, or circle for examples, effectively abstracting the high pixel resolution of the graphic element into a set of low-pixel resolution geometric components which are easier to describe and interact with. In one embodiment, a single dot is constructed based on a cluster of 10 to 50 original pixel resolution, i.e., 1 dot=a circle of 10 to 50 original pixels depending on stylus selection and available pixel resolution. Each dot of the dotted lines may be mapped into a low-resolution X/Y framework which may be accessed and tracked by the virtual stylus spatial tracker 356 of the stylus tracking & guiding system 350 of the AR content entities description system.

The graphical element may be decomposed into a graph representation. A decomposed 2D graphical element may use a X/Y framework, while a 3D graphical element may use a X/Y/Z framework. The graph representation of the graphical element may be of various sizes for better tracking and memorization. As an example, a graphical element of size ABC can be decomposed and virtualized into a scale down or a scale up representation based on the important elements of shapes and contours of the graphical element. A scale up representation may be two times (2×) bigger than the original size of the graphical element. A scale down representation may be two times (2×) smaller than the original size of the graphical element. Creating a scaled up or down representation of the graphical element may act as a virtual zoom in and zoom out function. This zoom in/out function may highlight particular elements of the graphical element to help a visually impaired user obtain a better understanding of the graphical element.

The image decomposition module 314 may index and structure the decomposition of graphical content elements, along with any associated information of wireframes, dotted lines, and spatial locations of the graphical content elements, in the content description layer 326 in the content entities description layer component 320 of the AR content entities description system.

The concepts correlation module 315 of the content entities processing system 310 may search and assign concepts to the extracted content elements of a content entity. The concepts correlation module 315 may use a learned model to accurately assign concepts to content elements. The learned model may be generated by a model trainer using an ensemble method. The ensemble method may include a linear support vector classification, logistic regression, k-nearest neighbor, naïve Bayes, stochastic gradient descent or Apriori algorithm. A concept to a content element may be a particular subject or topic that may be representative of the substance of the content element. As an example, for a particular content entity, such as a particular page of a biology textbook, the concepts correlation module 315 may assign one or more concepts to content elements from the particular content entity, such as enzymes, cells, cellular respiration, photosynthesis, macromolecules, and membranes.

The concepts correlation module 315 may also identify associations between concepts of content elements. Using pre-identified associations between concepts of content elements, the concepts correlation module 315 may generate concept pairs, where concepts in a concept pair are related to each other. The pre-identified associations may be stored in the knowledge library 370. The concepts correlation module 315 may also identify concepts appearing in a plurality of similar content entities stored in the knowledge library 370. The concepts correlation module 315 may then create new associations between these identified concepts.

In one embodiment, the concepts correlation module 315 may identify associations between concepts based on a determination that two concepts frequently appear in proximity to one another in similar content entities. The concepts correlation module 315 may identify associations between concepts appearing in proximity to one another based on content entities and associated concepts stored in the knowledge library 370. As an example, the concepts correlation module 315 may identify concepts appearing in the same section of two similar 2D content entity documents. The concepts correlation module 315 may then associate these identified concepts appearing in the two 2D content entity documents. As another example, the concepts correlation module 315 may identify concepts associated with two similar 3D content entity objects. The concepts correlation module 315 may then associate these identified concepts of the two similar 3D content entity objects.

With regards to concepts assigned to a content entity, the concepts correlation module 315 may generate an indicator representing the strength of the association between the concept and the content entity. As an example, a first concept that is assigned to a first document content entity may have a very high strength of association to the first document content entity. The concepts correlation module 315 may then generate an indicator with a score of 0.99 out of 1. As another example, a second concept that is assigned to a second document content entity may have a very weak strength of association to the second document content entity. The concepts correlation module 315 may then generate an indicator with a score of 0.20 out of 1.

The concepts correlation module 315 may create a list of assigned concept pairs associated with the content elements of the content entity. The list may be indexed and structured within the concepts description layer 324 of the content entities description layer 320 component of the AR content entities description system. The assigned concepts with the associated content elements in respective content entities may be stored in the knowledge library 370.

The supplemental content module 316 of the content entities processing system 310 may assign supplemental content to the extracted content elements of a content entity. Assigning supplemental content may be performed by searching in the knowledge library 370 for key terms, concepts and definitions associated with the extracted content element of the content entity. The supplemental content module 316 may identify other content entities stored in the knowledge library 370 that are associated with the key terms, concepts and/or definitions that were used in the search. The identified content entities may be similar or related to the content entity being analyzed. The identified content entities may be assigned to the extracted content elements of the content entity as supplemental content.

The supplemental content may be 2D and/or 3D content entities, such as text documents, audio files, interactive Question & Answer files, as some examples. The supplemental content may provide additional descriptions and information of the content entity. The supplemental content module 316 may index and structure the supplemental content in the supplemental content layer 328 in the content entities description layer component 320 of the AR content entities description system.

The content entities description layers 320 of the content entities description system 300 may include an entity composition layer 322, a concepts description layer 324, a content description layer and a supplemental content layer 328. The content extraction module 312 may index and structure extracted text characters, along with any files and information associated with similar content entities stored in the knowledge library 370, in the content description layer 326. The spatial composition deconstruction module 313 may index and structure the composition layout layer, along with all spatial location determinations of the content elements of the content entity, in the entity composition layer 322. The image decomposition module 314 may index and structure the decomposition of graphical content elements, along with any associated information of wireframes, dotted lines, and spatial locations of the graphical content elements, in the content description layer 326. The concepts correlation module 315 may index and structure the list of all assigned concept pairs associated with the content elements of the content entity within the concepts description layer 324. The supplemental content module 316 may index and structure the supplemental content in the supplemental content layer 328.

The stylus tracking & guiding systems 350 of the content entities description system 300 may include an overlay guiding data analyzer module 352, a stylus overlay composition tracker module 354, a virtual stylus spatial tracker module 356, and a spatial tracker guiding feedback module 358.

The virtual stylus spatial tracker module 356 of the stylus tracking & guiding systems 350 may track the spatial location of a physical stylus used by the visually impaired user 150. A physical stylus may include a finger, a pen, a ruler, or any other object associated with and used by the visually impaired user's 150 person. The physical stylus may be used by the visually impaired user 150 to interact with an observable 2D/3D content entity, such as observable 2D/3D content entities 160. The visually impaired user 150 may use a physical stylus to interact with the extracted content elements of the observable 2D/3D content entities 160. The virtual stylus spatial tracker module 356 may track the position of the physical stylus in real-time using camera(s) 336 of the embedded systems 330. Using the tracked position of the physical stylus, the virtual stylus spatial tracker module 356 may digitalize the physical stylus into a virtual stylus. The virtual stylus may provide location data of the physical stylus to the content entities description system 300.

The stylus overlay composition tracker module 354 of the stylus tracking & guiding systems 350 may correlate the spatial location of the tip of the physical stylus. While the visually impaired user 150 is using the physical stylus on the surface of the observable 2D/3D content entity 160, the stylus overlay composition tracker module 354 may correlate the spatial location of the tip of the physical stylus to the spatial mapping of the content entity 160 in a digital domain. The correlated data may provide additional information of the content entity 160 based on the point of view, angle and speed of movement of the physical stylus as it is used on the surface of the content entity 160. The correlated data may be used by the content entities description system 300 to analyze the content entity 160. The content entities description system 300 may use the correlated data to generate a string of dots to be overlaid onto a digital mapping of the content entity 160. Each dot may be a reflection of the real-time location of the physical stylus obtained by the virtual stylus spatial tracker module 356.

The overlay guiding data analyzer module 352 of the stylus tracking & guiding systems 350 may determine a range between the spatial location of a dot generated using the correlated data and the spatial location of content elements within the content entity 160. As explained above, the stylus overlay composition tracker module 354 may use correlated data to generate a string of dots to be overlaid onto a digital mapping of the content entity 160. The overlay guiding data analyzer module 352 may use the correlated data and string of dots to determine a range between the spatial location of a dot and the spatial location of content elements within the content entity 160. The spatial location of content elements in the content entity 160 may be determined by the spatial composition deconstruction module 313 of the content entities processing systems 310 of the content entities description system 300.

The determined range between the spatial locations of a dot and content elements of the content entity 160 may be used to determine if the spatial location of the physical stylus of the virtually impaired user 150 is at or near the location of a content element. The content entities description system 300 may use the spatial tracker guiding feedback module 358 to translate the determined range into feedback for the visually impaired user 150. The spatial tracker guiding feedback module 358 may generate feedback according to how close or far the spatial location of the physical stylus is based on the determined range.

In one embodiment, if the determined range is zero, where the spatial location of the physical stylus is at the spatial location of a particular content entity, the spatial tracker guiding feedback module 358 may generate feedback to notify the visually impaired user 150 of the content element that is being pointed at using the physical stylus. The content entities description system 300 may then obtain associated information of the particular content element from the content entities description layer component 320 and provide the associated information to the visually impaired user 150 using the sound engine 342 of the interactivity systems 340.

In another embodiment, if the determined range is small, the spatial tracker guiding feedback module 358 may generate feedback to guide the visually impaired user 150 towards the closest content element based on the spatial location of the physical stylus. The content entities description system 300 may provide the feedback to the visually impaired user 150 using the sound engine 342 of the interactivity systems 340. The content entities description system 300 may provide the feedback to the visually impaired user 150 using the sensors 332 of the embedded systems 330. The feedback may be audio messages, sounds, tones, vibrations, or physical pressure, such as a tap, either individually or in combination. As an example, the feedback may be speech guidance that includes audio messages to be provided to the visually impaired user 150, such as "Move your Stylus a little bit to the left, right, up, down to get the description of the "ABC Content Element." As another example, the feedback may be sound guidance that includes a higher or lower pitch note to indicate the relative proximity of the physical stylus to the closest content element of the content entity 160.

Providing interactions between the visually impaired user 150 and the content entities description system 300 through the AR connected device 140 may increase the navigation and understanding of content entities. In addition, providing feedback to a visually impaired user may further increase the efficiency in the navigation and understanding of content entities.

The interactivity systems 340 of the content entities description system 300 may include a sound engine 342, a voice recognition engine 344, and a speech engine 346. The interactivity systems 340 may be included in the AR device connected to the content entities description system 300, such as AR connected device 140. The content entities description system 300 may use the sound engine 342 to provide descriptions of the content entities being observed by a user of the AR connected device 140, such as visually impaired user 150. The content entities description system 300 may use the sound engine 342 to provide instructions and interactive guidance to the visually impaired user 150 to help the visually impaired user 150 understand content entities. As an example, the content entities description system 300 may use the sound engine 342 to send audio messages to the visually impaired person, instructing and guiding the visually impaired person to follow the shape of an apple sitting on a desk. The sound engine 342 may include speakers and other similar components that can project sound.

The content entities description system 300 may use the voice recognition engine 344 to identify the person using the AR connected device 140. The content entities description system 300 may use the sound engine 342 and voice recognition engine 344, in combination, to interact with the visually impaired user. The voice recognition engine 344 may use voice audio received from a person using the AR connected device 140, such as visually impaired user 150, to identify who the visually impaired user 150 is. In one embodiment, the content entities description system 300 may use the sound engine 342 to ask the visually impaired user 150 for his identification. Upon receiving a response from the visually impaired user 150 using microphone 334 of the embedded systems 330, the voice recognition engine 344 of the interactivity systems 340 may determine the identity of the visually impaired user 150. The content entities description system 300 may use the user preferences system 360 to access a database of stored user profiles and select the user profile that matches the visually impaired user 150 based on the voice audio of the visually impaired user 150 and/or the response of the visually impaired user 150.

The content entities description system 300 may use the speech engine 346 to determine the type of speech to use for the visually impaired user 150. The content entities description system 300 may use the speech engine 346 to analyze the audio being received from the visually impaired user 150 by microphone 334 of the embedded systems 330. The speech engine 346 may determine one or more characteristics of the received audio. Based on the characteristics of the received audio, the speech engine 346 may apply one or more speech options to be used by the content entities description system 300 in providing audio to the visually impaired user 150 through sound engine 342. The speech engine 346 may also apply one or more speech options to be used according instructions received from the visually impaired user 150. Such instructions from the visually impaired user 150 may be received via audio by the microphone 334 or by a selection of settings received by sensors 332 of the embedded system 330. Speech options of the speech engine 346 may include languages, types of voices, such as male or female and education level, that the content entities description system 300 will apply to the audio to be provided to the visually impaired user 150.

The content entities description system 300 may also provide a voice command option as an interface between the visually impaired user 150 to allow the visually impaired user 150 to use the content entities description system 300 more efficiently. The voice command option may be included in the speech engine 346. The voice command option may allow audio messages to be received from the visually impaired user 150. The speech engine 346 may analyze the audio messages and provide responses according to the received audio messages. For example, the speech engine 346 may receive a voice command of "tell me which content elements are available in this content entity." The content entities description system 300 may then respond with a listing of the content elements. As another example, the speech engine 346 may receive a voice command of "guide me to the "ABC" content element." The content entities description system 300 may provide a response of directional guidance to the visually impaired user 150 based on its last detected physical stylus spatial location. As another example, the speech engine 346 may receive a voice command of "tell me about all the content layers corresponding to the spatial location of my stylus." The content entities description system 300 may provide a response of an interactive listing of all the available content layers matching the content element identified by the location of the physical stylus.

The user preferences system 360 of the content entities description system 300 may include a user profile module 362, an educational activities module 364 and an AR device (s) module 366. The user preferences system 360 may be a database that stores information and data of all persons who use and/or are registered with the content entities description system 300. A user of the content entities description system 300 may be a person who is wearing and/or using the AR device associated and/or connected to the content entities description system 300, such as a visually impaired person. The profiles of all users may be uploaded in user profile module 362. A user's profile may include the respective user's name, age, address, contact information, preferred language, education level, and other personal information and/or preferences. A particular user's profile may be selected in the user profile module 362 when the particular user is connected to the content entities description system 300. In one embodiment, a particular user may be connected to the content entities description system 300 when the particular user is wearing and/or using an AR device that is connected to the content entities description system 300. In another embodiment, a particular user may be connected to the content entities description system 300 when the particular user has signed into the AR connected device that is connected with the content entities description system 300.

The educational activities module 364 may include a list of all of the various educational activities, subjects, topics, etc. that are available for users in the content entities description system 300. A user may select the educational activities that they are interested in. The list of educational activities for a particular user may be selected from the educational activities module 364 when the particular user is connected to the content entities description system 300.

The AR device(s) module 366 may include a list of all AR devices that are associated with the content entities description system 300. The AR device(s) module 366 may also store information of specifications, settings, capabilities, and overall performance for each AR device listed. The information of a particular AR device may be selected from the AR device module 366 when a user has connected to the content entities description system 300 using the particular AR device. The content entities description system 300 may then interact with the user via the particular AR device according to the information associated with the particular AR device.

Figure 4:
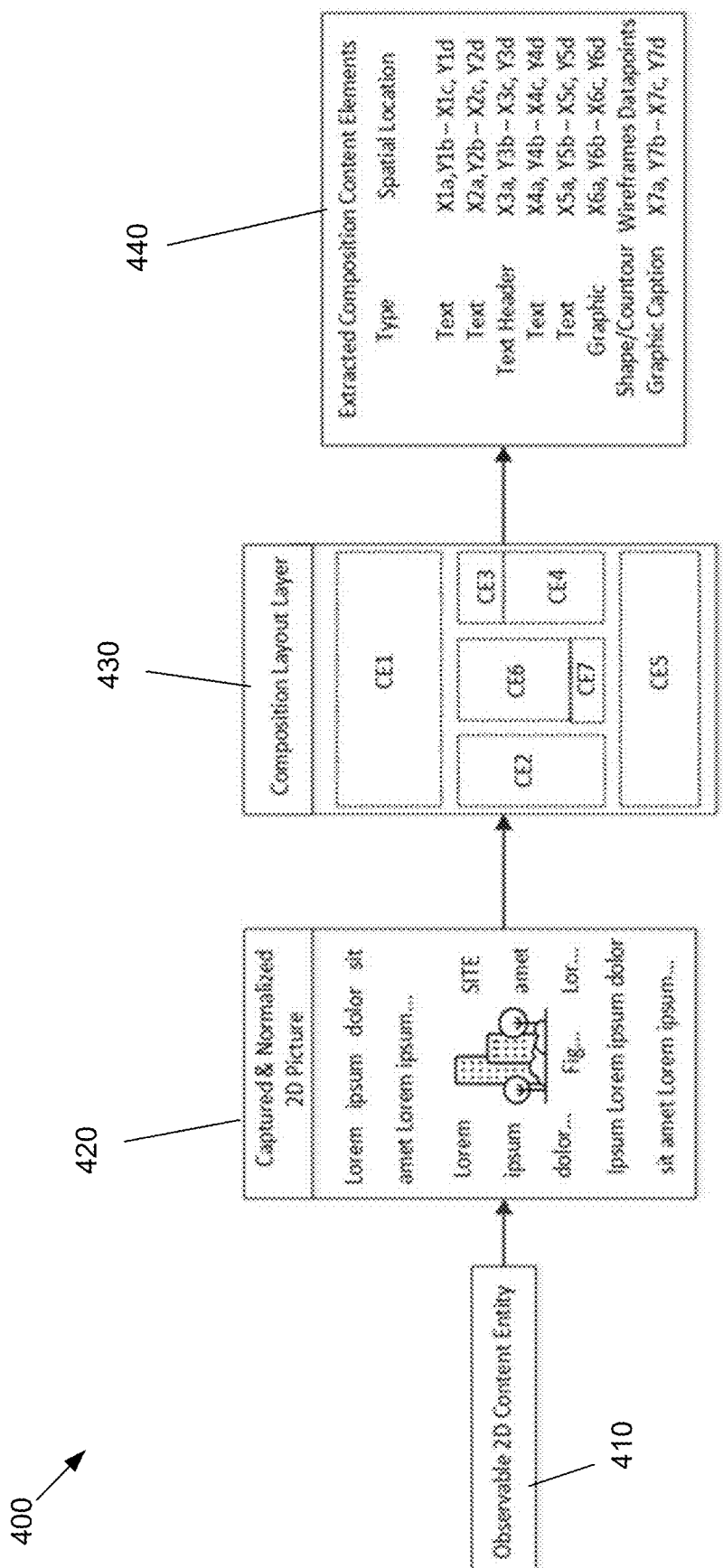
FIG. 4 illustrates an example diagram of the decomposition of a content entity in accordance with some embodiments.

FIG. 4 illustrates an example diagram 400 of the decomposition of a captured 2D content entity into a composition layout layer and a list of content elements using the content entities description system. The content entities description system may be the content entities description system 100 in FIG. 1 and/or the content entities description system 300 in FIG. 3. Here, the content entities description system may use a camera(s), such as camera(s) 336 of the embedded systems 330 in an augmented reality connected device 140, to capture an observable 2D content entity 410. The captured images of the observable 2D content entity 410 may then be normalized. Normalizing the captured images may determine that the 2D content entity 410 being observed is a single page of a printed textbook, with text and graphical elements. Capturing and normalizing the images of the observable 2D content entity 410 may be performed by the capture & analysis module 311 of the content entities processing systems 310.

After capturing and normalizing images of the observable 2D content entity 410, the content entities description system may extract the content elements embedded in the captured and normalized images 420. The extraction of content elements may be performed by the content extraction module 312 of the content entities processing system 310 of the AR content entities description system 200. The content elements of the captured content entity 410 may include text characters, graphical characters, paragraphs, columns, headers, captions, and shapes.

The content entities description system may further deconstruct the captured and normalized images 420 to create a composition layout layer 430 of the content entity 410. Deconstructing the images 420 to create a composition layout layer 430 may be performed by the spatial composition deconstruction module 313 of the content entities processing systems 310 of the AR content entities description system 200. The composition layout layer 430 may determine the spatial location of the content elements of the captured content entity 410 based on the information determined from extracting the content elements. The composition layout layer 430 may be sectionalized into various groups according to the information from the extraction.

As shown in FIG. 4, the composition layout layer 430 may determine seven different groups of content elements, shown as CE1 to CE7. In this example diagram 400, the content element groups CE1 and CE5 may be displayed as horizontal rectangles covering the top and bottom sections of the composition layout layer. Groups CE1 and CE5 may each represent the spatial sections in the content entity that includes multiple lines of extracted text in the form of paragraphs. Groups CE2 and CE4 may be displayed as vertical rectangles of the composition layout layer and may each represent the spatial sections in the content entity that includes columns of text. Group CE3 may be displayed as a small rectangle and may represent the spatial section in the content entity that includes a single header. Group CE6 and CE7 may represent the spatial section in the content entity that includes a graphical element and its associated caption, respectively.

Using the information gathered from extracting the content elements and creating the composition layout layer 430 of the content entity 410, the content entities description system may create a list of all of the extracted content elements, such as list 440. The list 440 may include the type of each content element and the spatial location of each content element based on the composition layout layer. The list 440 may associate particular content elements together according to their respective spatial location. As an example, the content element of the caption in Group CE7 may be associated with the graphical element in Group CE6, since the spatial location of each in accordance to the overall composition layout layer 430 represents that the caption in Group CE7 is for the graphical element in Group CE6.

The content entities description system may describe the composition layout layer 430 of the content entity 410 to a visually impaired user. The visually impaired user may choose a particular content element group from the composition layout layer 430 for the content entities description system to describe. Based on the feedback provided by the visually impaired user, the content entities description system may provide the respective extracted content element(s) from the list 440. The content entities description system may describe any relationships between the different content elements in the content entity based on each spatial location of each content element.

Figure 5:
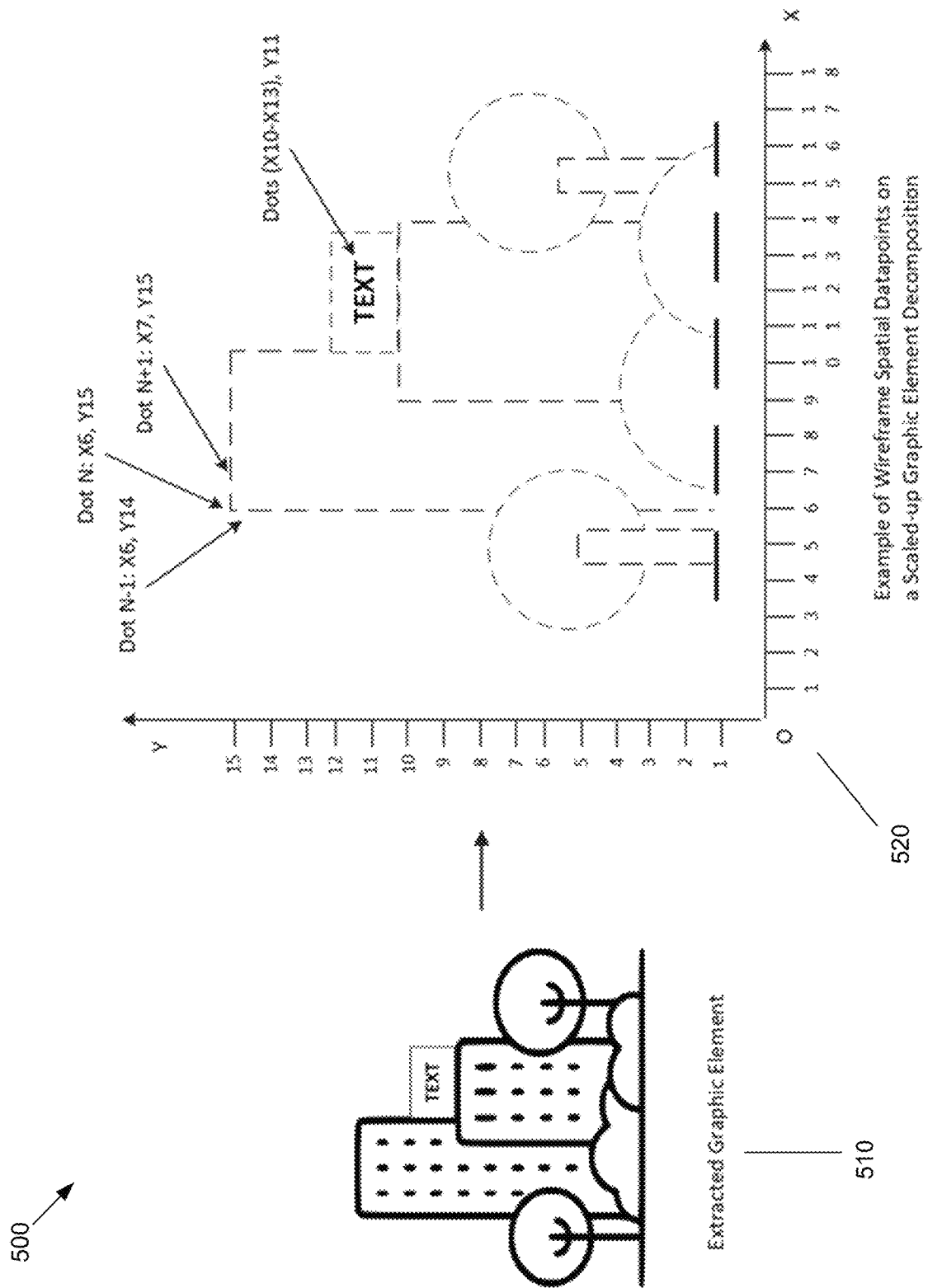
FIG. 5 illustrates an example diagram of an image decomposition of a graphical element in accordance with some embodiments.

FIG. 5 illustrates an example diagram 500 of the image decomposition of a graphical element in a content entity using the content entities description system. The content entities description system may be the content entities description system 100 in FIG. 1 and the content entities description system 300 in FIG. 3. The content entities description system may extract the graphical element 510 from the captured and normalized images 420 of the content entity 410. The extraction may be performed by the content entities description system by defining the contours and shapes embedded within the extracted graphical element 510. The content entities description system may then decompose the graphical element 510 as a series of wireframes based on the defined shapes and contours, as shown in graph 520. Decomposing the graphical element 510 may be performed by the image decomposition module 314 of the content entities processing system 310 of the AR content entities description system 200.

Graph 520 may display the set of wireframes as dotted lines following the shape and contour of the key elements of the graphical element 510. Each dotted line may be made of multiple regularly distributed dots defined by their 2D/3D spatial location in relation to each defined shape and contour of the graphical element 510. The dotted lines may be constructed using a generic set of geometric shapes, such as triangle, rectangle, or circle for examples, effectively abstracting the high pixel resolution of the graphic element 510 into a set of low-pixel resolution geometric components which are easier to describe and interact with.

As shown in example diagram 500, the graphical element 510 may be extracted and decomposed into a series of dotted lines, using geometric surfaces, as displayed in graph 520. Each dot of the dotted lines may be mapped into a low-resolution X/Y framework which may be accessed and tracked by the virtual stylus spatial tracker 356 of the stylus tracking & guiding system 350 of the content entities description system. A decomposed 2D graphical element may use a X/Y framework while a 3D graphical element may use a X/Y/Z framework.

Using the determined wireframes, spatial coordinates and dotted lines of a decomposed graphical element 360, as shown in graph 520, the content entities description system may describe the graphical element 510 to a visually impaired user. As the content entities description system is describing the graphical element 510, the visually impaired user may use a virtual stylus to create a mental representation of what the graphical element 510 looks like. The virtual stylus may be a finger, pen, or any object associated with the visually impaired user.

The content entities description system may provide instructions and guidance to the visually impaired user so that the visually impaired user may follow the contour and shape of the graphical element 510 according to the wireframes, spatial coordinates, and dotted lines determined in graph 520. As an example, the content entities description system may provide instructions to guide the visually impaired person to follow the shape of an apple sitting on a desk. The content entities description system may tailor the instructions and guidance to the visually impaired user based on feedback from one or more components of the stylus tracking & guiding system 350. The content entities description system may provide instructions and guidance to the visually impaired user using the sound engine 342, voice recognition engine 344 and speech engine 346 of the interactivity systems 340.

Figure 6:
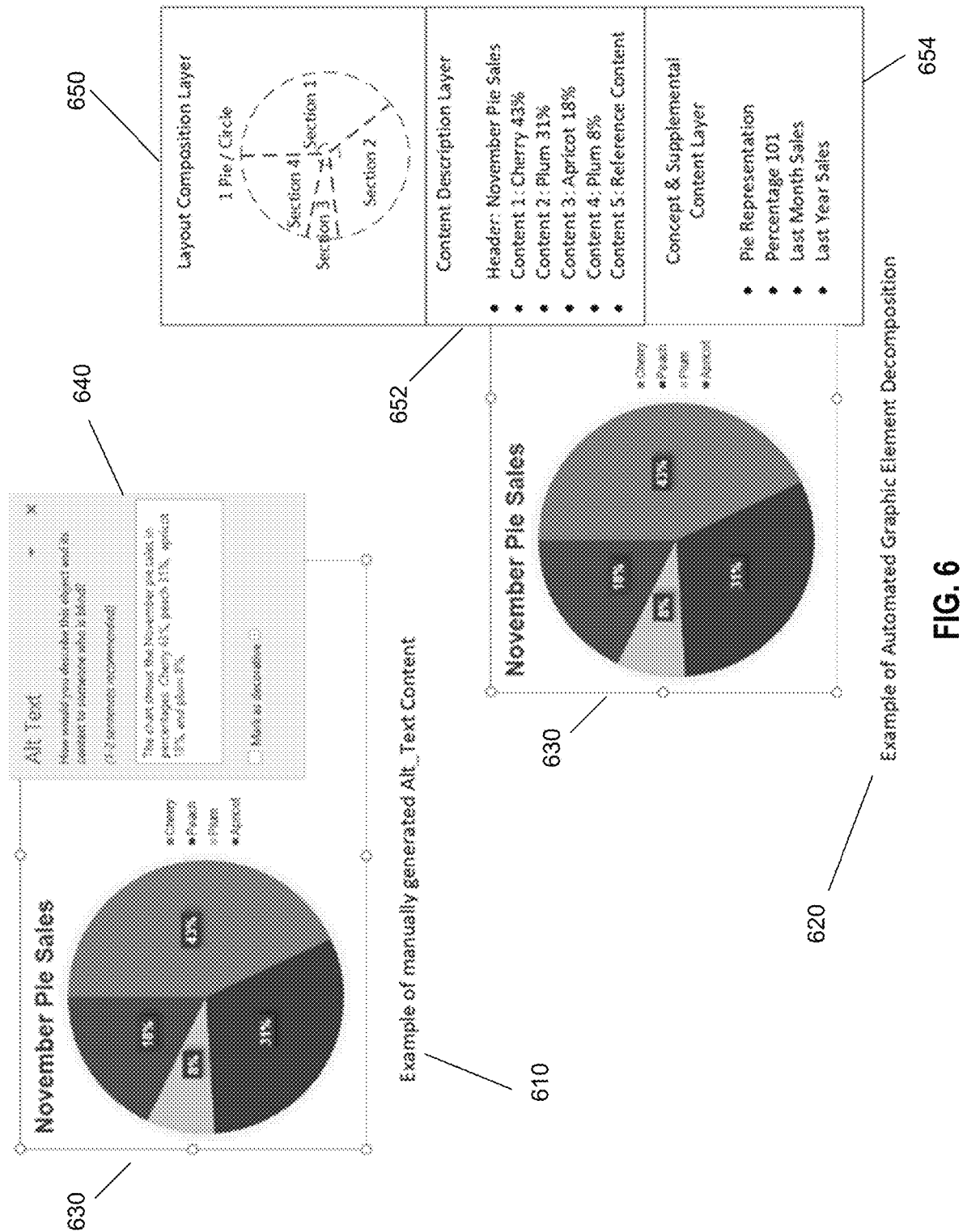
FIG. 6 illustrates examples of virtual representations of a content entity using Alt-Text and the augmented reality content entities description system in accordance with some embodiments.

FIG. 6 illustrates examples of virtual representations of a content entity using an Alt-Text method and the AR content entities description system. The AR content entities description system may be the AR content entities description system 102 in FIG. 1 and the AR content entities description system 200 in FIG. 2. In one embodiment, content entity 630 may be decomposed using an alternative text (Alt-Text) method, as displayed in virtual representation 610. The Alt-Text method may use descriptive text, such as Alt Text box 640, to convey the meaning and context of a graphical element in a digital setting, such as on an app or web page. When individuals looking at a screen, such as screen readers of Microsoft Narrator, JAWS, and NVDA, look at a content entity 630 with Alt Text box 640, such as virtual representation 610, the individuals may read the description in the Alt-Text box 640 aloud. Reading the Alt-Text box 640 aloud may allow the individuals to better understand the content entity on the screen. A well-written and descriptive Alt-Text box 640 may dramatically reduce ambiguity and improves user experience.

A content entity 630 may be decomposed using the AR content entities description system, as displayed in virtual representation 620. The AR content entities description system, such as AR content entities description system 102 of FIG. 1 or AR content entities description system 200 of FIG. 2, may use one or more components and modules to create a composition layout layer 650, a content description layer 652 and a concept & supplemental content layer 654 of the content entity, as shown in virtual representation 620. The descriptions and information provided by the AR content entities description system in the composition layout layer 650, content description layer 652 and concept & supplemental content layer 654 may have more information about the content entity 630, including its shape, contour, colors, etc., to better describe the content entity 630 to an individual, such as a virtually impaired person. Also, the AR content entities description system may use one or more components and modules to interact with an individual, such as a virtually impaired person, to instruct and guide the individual in understanding the content entity 630. Further, the AR content entities description system may be able to analyze and extract content elements of content entities that have not already been analyzed and stored in a database, thus increasing the learning opportunities for individuals, especially individuals who are visually impaired.

Figure 7:
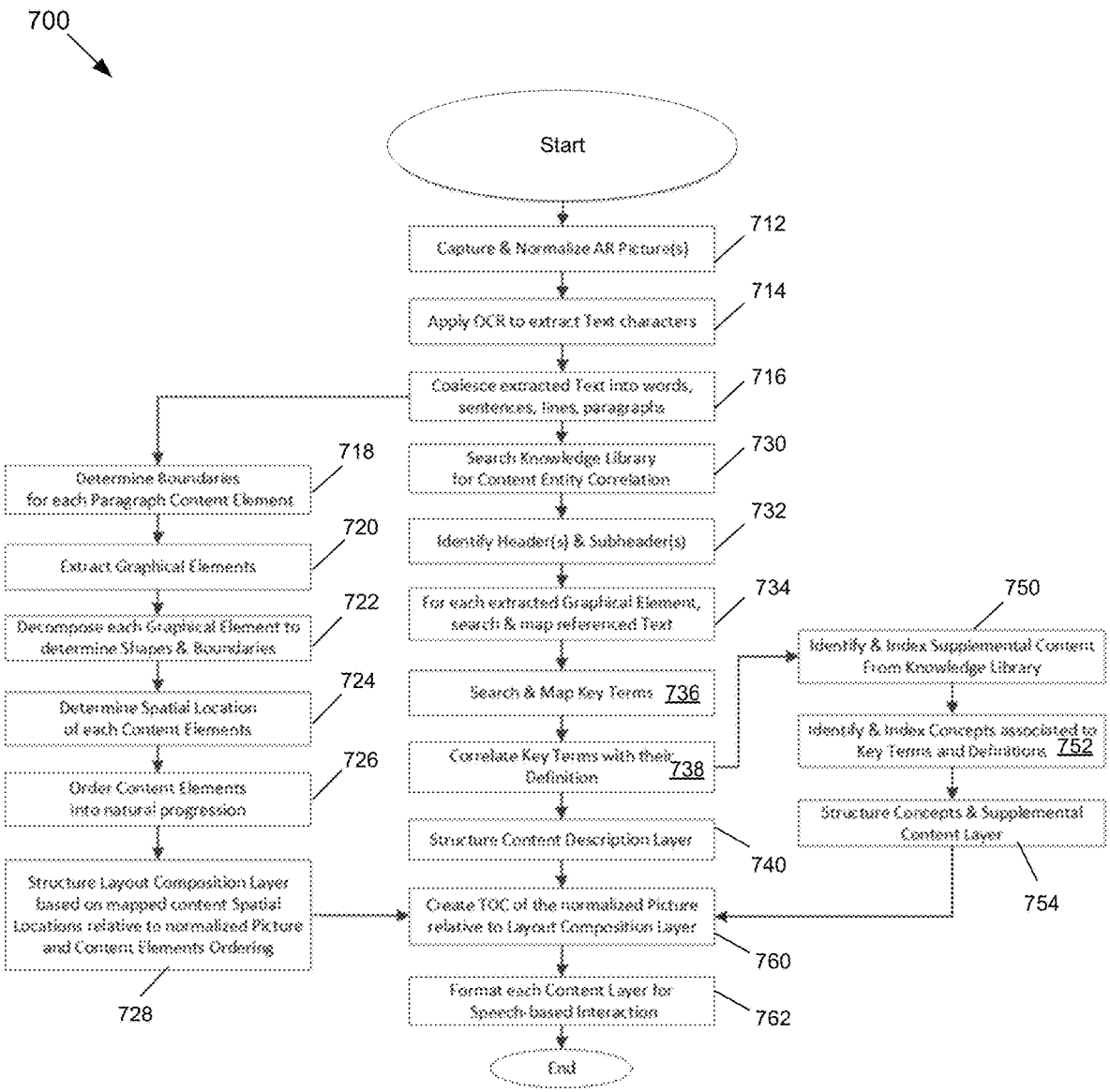
FIG. 7 illustrates an example flowchart for creating augmented reality content entities content layers in accordance with some embodiments.

FIG. 7 illustrates an example process 700 for creating AR content layers of a content entity in the content entities description system. In some embodiments, the process 700 may be executed, for example, by the content entities description system 100 of FIG. 1 or the content entities description system 300 of FIG. 3. The process 700 may also be executed by the AR content entities description system 102 of FIG. 1 or the AR content entities description system 200 of FIG. 2. Although the process 700 may be executed by any number of different components and systems, to simply discussion, the process 700 will be described relative to the AR content entities description system 200 of FIG. 2 and, more particularly, the content entities description system 300 of FIG. 3. As described relative to FIG. 3, the content entities description system 300 includes a plurality of components and modules, including the AR content entities description system 200 of FIG. 2. The content entities description system 300 may be used to generate an entity composition layer, a concepts description layer, a content description layer and a supplemental content layer.

At block 712, the content entities description system 300 may capture and normalize AR pictures of a content entity, such as observable 2D/3D content entity 160 of FIG. 1, using the capture & analysis module 311 of the content entities processing system 310 of FIG. 3. The content entities description system 300 may use the camera(s) 336 of the AR embedded systems 330 to capture images of the content entity 160. The capture & analysis module 311 may process the captured images through one or more software, such as an image processing software. The software may normalize the captured images by correcting any possible issues, such as centering, aspect ratio, focus, lighting, and other imagery parameters. Normalization of the captured images may be performed before the images are analyzed.

After the captured images have been normalized, the capture & analysis module 311 may then perform operations of analyzing the content entity 160 displayed in the captured images. Operations may include determining and categorizing the content entity 160 as either a 2D or 3D content entity. If the content entity 160 is categorized as a 2D content entity, such as pages of a document for example, such a 2D content entity may be further analyzed by selecting the best normalized image amongst the captured images.

If content entity 160 is categorized as a 3D content entity, such as a real life object of a desk for example, such a 3D content entity may be further analyzed by determining the width, height, area, volume, and other characteristics of the 3D content entity. The capture & analysis module 311 may conduct an analysis of the 3D content entity by using one or more software. The capture & analysis module 311 may conduct the analysis of the 3D content entity by using the camera(s) 336 and sensors 332 of the AR embedded systems 330. For example, if the AR embedded systems 330 has two cameras positioned at different ends of a device, such as AR connected device 140, images captured by each camera may be compared to measure displacements between both viewpoints and pairing images taken from each camera at the same point in time to estimate characteristics of the 3D content entity, such as its depth.

The capture & analysis module 311 may further analyze all of the normalized captured images of the content entity 160 to determine their overall quality. The overall quality may be based on one or more factors, including composition, sharpness, light and exposure. If the overall quality of the normalized captured images are below an image quality threshold, then the capture & analysis module 311 may send instructions to the AR embedded systems 330 to capture more images of the content entity 160 using camera(s) 336. The instructions to capture more images may include direct feedback to the visually impaired person 150 wearing and/or using the AR embedded systems 330. The direct feedback may be provided to the visually impaired person 150 through microphone 334 of the AR embedded systems 330. The microphone 334 may include a microphone to obtain voice commands from the visually impaired user 150 and a speaker to provide audio to the visually impaired user 150. The direct feedback may include instructions of how to improve the quality of the captured images. For example, the direct feedback to the visually impaired user 150 may include instructions to change the lighting conditions and adjust the position of the observable 2D/3D content entities 160 before taking new photos of the observable 2D/3D content entities 160 using camera(s) 336. Any interactions between the visually impaired user 150 and the AR embedded systems 330 are performed through speech and voice commands through the microphone 334 and sound engine 342.

At block 714, the content entities description system 300 may apply techniques, such as optical character recognition (OCR) to extract text characters from the content entity 160. The content entities description system 300 may use the content extraction module 312 of the processing system 310 of FIG. 3 to extract the text characters. The content extraction module 312 may extract content elements, such as text characters, embedded in the captured and normalized images of the content entity 160. Techniques, such as OCR, may be applied by the content extraction module 312 to extract individual text characters from the normalized captured images of the content entity 160.

At block 716, the content entities description system 300 may coalesce the extracted text characters into words, sentences, lines and/or paragraphs. The content entities description system 300 may use the content extraction module 312 of the processing system 310 to coalesce the text characters.

At block 718, the content entities description system 300 may determine boundaries for each paragraph content element. After extracted text characters of content entity 160 have been coalesced into words, sentences, lines and/or paragraphs, as described in blocks 714 and 716, the content entities description system 300 may determine boundaries for each paragraph content element. The content entities description system 300 may determine boundaries by identifying the spatial locations of the paragraph content elements.

The content entities description system 300 may use spatial composition deconstruction module 313 of FIG. 3 to determine the spatial location of content elements, such as paragraph content elements. The spatial composition deconstruction module 313 may use techniques, such as principal components analysis (PCA) algorithm, linear discriminant analysis (LDA) or OCR algorithm, either alone or in combination, to deconstruct the captured images of the content entity 160. Deconstructing the captured images may generate boundaries of different sections of content elements in the content entity 160. The spatial composition deconstruction module 313 may further determine the spatial location of each content element of content entity 160. Using the generated boundaries and the spatial locations of each content element, the spatial composition deconstruction module 313 may determine the boundaries of paragraph content elements in the content entity 160.

At block 720, the content entities description system 300 may extract graphical elements of a content entity. The content entities description system 300 may use the content extraction module 312 of the processing system 310 of FIG. 3 to extract the graphical elements. The content extraction module 312 may extract content elements, such graphical elements, embedded in the captured and normalized images of the content entity 160. Techniques, such as OCR, may be applied by the content extraction module 312 to extract graphical elements from the normalized captured images of the content entity 160.

At block 722, the content entities description system 300 may decompose each graphical element to determine shapes and boundaries of each graphical element. The content entities description system 300 may use the image decomposition module 314 of the processing system 310 of FIG. 3 to decompose the graphical elements. The image decomposition module 314 may decompose any graphical content elements from the captured and normalized images of the content entity 160. A graphical element may be decomposed as a series of wireframes based on the defined shapes and contours of the graphical element. The set of wireframes may be displayed as dotted lines following the shape and contour of the key elements of the graphical element.

Each dotted line may be made of multiple regularly distributed dots defined by their 2D/3D spatial location in relation to each defined shape and contour of a graphical element. The dotted lines may be constructed using a generic set of geometric shapes, such as triangle, rectangle, or circle for examples, effectively abstracting the high pixel resolution of the graphic element into a set of low-pixel resolution geometric components which are easier to describe and interact with. Each dot of the dotted lines may be mapped into a low-resolution X/Y framework which may be accessed and tracked by the virtual stylus spatial tracker 356 of the stylus tracking & guiding system 350 of the AR content entities description system.

The graphical element may be decomposed into a graph representation. A decomposed 2D graphical element may use a X/Y framework, while a 3D graphical element may use a X/Y/Z framework. The graph representation of the graphical element may be of various sizes for better tracking and memorization. As an example, a graphical element of size ABC can be decomposed and virtualized into a scale down or a scale up representation based on the important elements of shapes and contours of the graphical element. A scale up representation may be two times (2×) bigger than the original size of the graphical element. A scale down representation may be two times (2×) smaller than the original size of the graphical element. Creating a scaled up or down representation of the graphical element may act as a virtual zoom in and zoom out function. This zoom in/out function may highlight particular elements of the graphical element to help a visually impaired user obtain a better understanding of the graphical element.

At block 724, the content entities description system 300 may determine the spatial locations of each content element in a content entity. The content entities description system 300 may use spatial composition deconstruction module 313 of FIG. 3 to determine the spatial location of content elements, such as text characters and graphical elements. The spatial composition deconstruction module 313 may use techniques, such as principal components analysis (PCA) algorithm, linear discriminant analysis (LDA) or OCR algorithm, either alone or in combination, to determine the spatial location of each content element of content entity 160. The spatial composition deconstruction module 313 may further use the techniques to deconstruct the captured images to generate boundaries of different sections of content elements in the content entity 160. Using the generated boundaries and the spatial locations of each content element, the spatial composition deconstruction module 313 may determine the spatial locations of the content elements in the content entity 160, along with how the different content elements are separated from each other.

At block 726, the content entities description system 300 may order the content elements into a natural progression. The order between the content elements may be based according to the content entity 160. The order between the content elements may be based according to the spatial locations of each content element and the generated boundaries between each set of content element, as described in block 724. Using information of the content entity 160, spatial locations of each content element and the generated boundaries, either individually or in combination, may allow the content entities description system 300 to determine an order between the content elements.

At block 728, the content entities description system 300 may structure a layout composition layer of the content entity. The content entities description system 300 may structure a layout composition layer based on the spatial locations and boundaries of the content elements of the content entity 160. The spatial locations of content elements may be based on the normalized images and the ordering of the content elements. The layout composition layer may be a representation of the content entity 160 and how all of the content elements are sectionalized in the content entity 160 according to spatial locations and boundaries of the content elements.

At block 730, the content entities description system 300 may search the knowledge library for content entity correlation. The knowledge library may be the content entities knowledge library 370 of FIG. 3 or the online education platform 110 of FIG. 1. As text characters and graphical elements are extracted and coalesced by the content extraction module 312, the content entities description system 300 may also provide instruction to the knowledge library 370 to search one or more library databases for stored files and information of 2D and/or 3D content entities similar to the content entity 160. The files and information of 2D and 3D content entities stored in the library databases of the content entities knowledge library 370 may include images, extracted content elements, and additional information of 2D and 3D content entities that have previously been analyzed. All 2D and 3D content entities stored in the library databases may be previously analyzed and deconstructed before being stored.

For example, the OCR technique may perform an extraction of a string of consecutive text characters that are collectively forming multiple words as presented in a single line of text within a particular 2D content entity of a page of a document. Using the string of text characters, the content extraction module 312 may filter out pages and documents of 2D content entities, stored in the library databases of the content entities knowledge library 370, that do not include that particular string. When the string is unique, it may lead to the identification of a single page, its related document and associated content within the entire content entities knowledge library 370 that is the same or very similar to the observable 2D/3D content entities 160. If the string is not unique, the correlation of a longer string, or alternatively the correlation of a second string of consecutive text characters and/or graphical characters at a different spatial location within the same particular observable 2D/3D content entities 160, may help with filtering out any possible duplicates, resulting in finding all corresponding documentation and data of content entities, that are the same or very similar to the observable 2D/3D content entities 160, stored in the library databases of the content entities knowledge library 370.

Further, techniques, such as OCR, may be applied to captions of graphical elements of an observable 2D/3D content entities 160 to help identify such graphical elements. The content extraction module 312 may use the captions to filter through the data stored in the content entities knowledge library 370. For example, such captions may include "figure," "diagram," or "image." The presence of a caption in the stored information of a 2D or 3D content entity may indicate that a graphical element is embedded into the particular content entity. The location of the caption may also be used to determine the spatial location of a graphical element within a content entity and any text elements that may be associated with the graphical element. Using a combination of text and graphical characters of the observable 2D/3D content entities 160 may allow for better results with searching for data and information of the same or similar 2D or 3D content entities stored in the content entities knowledge library 370.

At block 732, the content entities description system 300 may identify header(s) and subheader(s) of the content entity. After the content extraction module 312 has extracted and coalesced the extracted text characters into words, sentences, lines and/or paragraphs, as described in blocks 714 and 716, the content entities description system 300 may further identify header(s) and subheader(s) from the coalesced text characters. The content entities description system 300 may determine text characters are headers and/or subheaders according to how the text characters are coalesced. The content entities description system 300 may determine text characters are headers and/or subheaders based on stored files of content entities with their associated content elements in the knowledge library 370. For example, if extracted text characters are coalesced to form the phrase "Chapter 1," the content entities description system 300 may determine according to files stored in the knowledge library 370 that the phrase "Chapter 1" is a header and/or subheader. The content entities description system 300 may also determine the phrase "Chapter 1" is a header and/or subheader based on the text characters not forming a complete sentence. The content entities description system 300 may also determine the phrase "Chapter 1" is a header and/or subheader if the phrase uses different size font, are bold, are italicized, are underlined, or any have any other characteristics that differ from other extracted text characters in the content entity 160.

At block 734, the content entities description system 300 may search and map text content elements to associated graphical elements. After the content entities description system 300 has extracted and coalesced content elements, such as text characters and graphical elements, and determined the spatial locations and boundaries of the content elements, the content entities description system 300 may further associated particular text content elements to graphical elements. The content entities description system 300 may determine that a particular text content element is associated to a particular graphical element according to their respective spatial locations. For example, if the content entities description system 300 determines that the spatial location of a particular text content element is located right above the spatial location of the particular graphical element, then the content entities description system 300 may determine that the particular text content element is associated with the particular graphical element.

The content entities description system 300 may determine a particular text content element is associated to a particular graphical element according to the description of each content element. As another example, if the content entities description system 300 determines that a particular text content element is "FIG. 1" and the particular graphical element is the only graphical element in the content entity 160, then the content entities description system 300 may determine that the particular text content element is associated with the particular graphical element.

At block 736, the content entities description system 300 may search and map key terms associated with the content entity. The content entities description system 300 may determine key words based on the content elements and the content entity. A key term may include a term that is used more than once in the content entity. A key term may include a term that is typically associated with the same types of content entities as content entity 160. The content entities description system 300 may map any key terms that are identified and determined to the content entity 160 and/or the content elements in the content entity 160.

At block 738, the content entities description system 300 may correlate any key terms with their respective definitions. The content entities description system 300 may access the knowledge library 370 to obtain the definitions of each key term of content entity 160 that was identified. The content entities description system 300 may search through the database of the knowledge library 370 using a key term as the basis for the search. The knowledge library 370 may provide all stored content entities and associated information that include or are associated with the key term. The content entities description system 300 may identify stored content entities and associated information that include the definition(s) of the key term. The content entities description system 300 may correlate the key term to the definition(s) included in the stored content entities and associated information.

At block 740, the content entities description system 300 may structure a content description layer. The content description layer may include all of the content elements, along with all descriptions and other information associated with the content elements, such as spatial locations, of content entity 160. The content entities description system 300 may use the content extraction module 312 to index and structure the content elements, along with any files and information associated with similar content entities stored in knowledge library 370, in the content description layer. The content entities description system 300 may further use the image decomposition module 314 to index and structure the decomposition of graphical content elements, along with any associated information of wireframes, dotted lines, and spatial locations of the graphical content elements, in the content description layer. The content entities description system 300 may store the content description layer in the content description module 326 in the content entities description layer component 320.

At block 750, the content entities description system 300 may identify and index supplemental content from the knowledge library to the content entity. The content entities description system 300 may use the supplemental content module 316 of FIG. 3 to identify and index supplemental content associated with the content entity 160. The supplemental content module 316 may search in the knowledge library 370 for additional content entities using the key terms associated with the content entity 160. The supplemental content module 316 may identify other content entities stored in the knowledge library 370 that are associated with the key terms. The identified content entities may be similar or related to the content entity being analyzed. The identified content entities may be assigned to the extracted content elements of the content entity as supplemental content.

The supplemental content may be 2D and/or 3D content entities, such as text documents, audio files, interactive Question & Answer files, as some examples. The supplemental content may provide additional descriptions and information of the content entity.

At block 752, the content entities description system 300 may identify and index concepts associated to the key terms and definitions mapped to the content entity. The content entities description system 300 may use the concepts correlation module 315 to identify and index concepts. The concepts correlation module 315 may search and assign concepts to the extracted content elements of a content entity. The concepts correlation module 315 may use a learned model to accurately assign concepts to content elements. The learned model may be generated by a model trainer using an ensemble method. The ensemble method may include a linear support vector classification, logistic regression, k-nearest neighbor, naïve Bayes, stochastic gradient descent or Apriori algorithm. As an example, for a particular content entity, such as a particular page of a biology textbook, the concepts correlation module 315 may assign one or more concepts to content elements from the particular content entity, such as enzymes, cells, cellular respiration, photosynthesis, macromolecules, and membranes.

The concepts correlation module 315 may also identify associations between concepts of content elements. Using pre-identified associations between concepts of content elements, the concepts correlation module 315 may generate concept pairs, where concepts in a concept pair are related to each other. The pre-identified associations may be stored in the knowledge library 370. The concepts correlation module 315 may also identify concepts appearing in a plurality of similar content entities stored in the knowledge library 370. The concepts correlation module 315 may then create new associations between these identified concepts.

In one embodiment, the concepts correlation module 315 may identify associations between concepts based on a determination that two concepts frequently appear in proximity to one another in similar content entities. The concepts correlation module 315 may identify associations between concepts appearing in proximity to one another based on content entities and associated concepts stored in the knowledge library 370. As an example, the concepts correlation module 315 may identify concepts appearing in the same section of two similar 2D content entity documents. The concepts correlation module 315 may then associate these identified concepts appearing in the two 2D content entity documents. As another example, the concepts correlation module 315 may identify concepts associated with two similar 3D content entity objects. The concepts correlation module 315 may then associate these identified concepts of the two similar 3D content entity objects.

The concepts correlation module 315 may create a list of assigned concept pairs associated with the content elements of the content entity. The assigned concepts with the associated content elements in respective content entities may be stored in the knowledge library 370.

At block 754, the content entities description system 300 may structure a concepts and supplemental content layer. The concepts and supplemental content layer may include all supplemental content associated with the content entity 160 and all assigned concepts to the content entity 160 and its content elements. The concepts and supplemental content layer may be a combination of an individual concepts content layer and an individual supplemental content layer. An individual concepts content layer may include and all assigned concepts to the content entity 160 and its content elements. An individual supplemental content layer may include all supplemental content associated with the content entity 160. The separate concepts content layer may be stored in the concepts description layer 324 of the content entities description layer 320. The separate supplemental content layer may be stored in the supplemental content layer 328 in the content entities description layer component 320. The concepts and supplemental content layer may be stored in the stored in both the concepts description layer 324 and the supplemental content layer 328.

At block 760, the content entities description system 300 may create a table of contents (TOC) of the normalized images relative to the layout composition layer. The content entities description system 300 may capture and normalize a plurality of images of content entity 160. The plurality of images of content entity 160 may be of different sections or different sections or portions of content entity 160, such as different pages of a textbook. The TOC of the plurality of images may be relative to the layout composition layer if the plurality of images are of different sections of content entity 160, such as different sections of a single page of document. The content entities description system 300 may generate a TOC amongst the plurality of images to itemize each image according to how they appear in the content entity 160.

At block 762, the content entities description system 300 may format the content layers for speech-based interaction. The content entities description system 300 may first collect all of the content layers of the layout composition layer, the content description layer, and the concepts and supplemental content layer. Once all of the content layers have been collected, the content entities description system 300 may format each content layer in accordance to one another. The content entities description system 300 may format each content layer according to one or more user preferences, voice commands, and feedback received from the visually impaired user 150. The content entities description system 300 may then generate speech of the content layers to be provided to the visually impaired user 150 using interactivity systems of the content entities description system 300.

Figure 8:
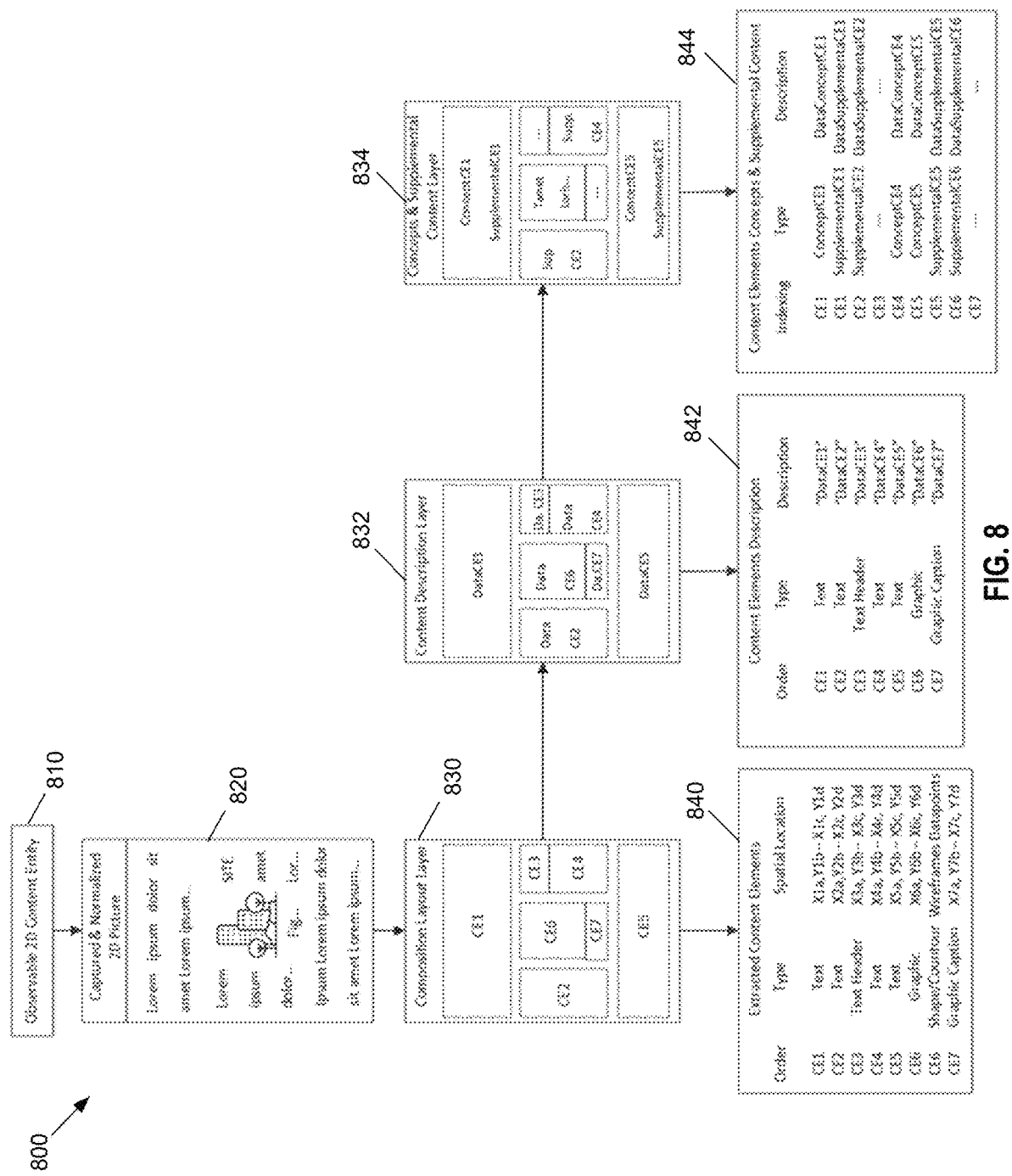
FIG. 8 illustrates an example diagram of the decomposition of an observable content entity into multiple content description layers in accordance with some embodiments.

FIG. 8 illustrates an example diagram 800 of the decomposition of an observable content entity into multiple content description layers in the content entities description system. The content entities description system may be the content entities description system 100 in FIG. 1 and/or the content entities description system 300 in FIG. 3. Here, the content entities description system may use a camera(s), such as camera(s) 336 of the embedded systems 330 in an augmented reality connected device 140, to capture an observable 2D content entity 810. The captured images of the observable 2D content entity 810 may then be normalized. Normalizing the captured images may determine that the 2D content entity 810 being observed is a single page of a printed textbook, with text and graphical elements. Capturing and normalizing the images of the observable 2D content entity 810 may be performed by the capture & analysis module 311 of the content entities processing systems 310.

After capturing and normalizing images of the observable 2D content entity 810, the content entities description system may extract the content elements embedded in the captured and normalized images 820. The extraction of content elements may be performed by the content extraction module 312 of the content entities processing system 310 of the AR content entities description system 200. The content elements of the captured content entity 810 may include text characters, graphical characters, paragraphs, columns, headers, captions, and shapes.

The content entities description system may further deconstruct the captured and normalized images 820 to create a composition layout layer 830 of the content entity 810. Deconstructing the images 820 to create a composition layout layer 830 may be performed by the spatial composition deconstruction module 313 of the content entities processing systems 310 of the AR content entities description system 200. The composition layout layer 830 may determine the spatial location of the content elements of the captured content entity 810 based on the information determined from extracting the content elements. The composition layout layer 830 may be sectionalized into various groups according to the information from the extraction. Each section of content elements may be shown in the composition layout layer 830 with dotted lines, shapes, and boundaries.

As shown in FIG. 8, the composition layout layer 830 may determine seven different groups of content elements, shown as CE1 to CE7. In this example diagram 800, the content element groups CE1 and CE5 may be displayed as horizontal rectangles covering the top and bottom sections of the composition layout layer. Groups CE1 and CE5 may each represent the spatial sections in the content entity that includes multiple lines of extracted text in the form of paragraphs. Groups CE2 and CE4 may be displayed as vertical rectangles of the composition layout layer and may each represent the spatial sections in the content entity that includes columns of text. Group CE3 may be displayed as a small rectangle and may represent the spatial section in the content entity that includes a single header. Group CE6 and CE7 may represent the spatial section in the content entity that includes a graphical element and its associated caption, respectively.

Using the information gathered from extracting the content elements and creating the composition layout layer 830 of the content entity 810, the content entities description system may create a list of all of the extracted content elements, such as list 840. The list 840 may include the type of each content element and the spatial location of each content element based on the composition layout layer. The list 840 may associate particular content elements together according to their respective spatial location. As an example, the content element of the caption in Group CE7 may be associated with the graphical element in Group CE6, since the spatial location of each in accordance to the overall composition layout layer 830 represents that the caption in Group CE7 is for the graphical element in Group CE6.

The content entities description system may describe the composition layout layer 830 of the content entity 810 to a visually impaired user. The visually impaired user may choose a particular content element group from the composition layout layer 830 for the content entities description system to describe. Based on the feedback provided by the visually impaired user, the content entities description system may provide the respective extracted content element(s) from the list 840. The content entities description system may describe any relationships between the different content elements in the content entity based on each spatial location of each content element.

After the composition layout layer 830 has been created, the content entities description system may create a content description layer 832. The content description layer 832 may be created based on the composition layout layer 830. The content description layer 832 may use the spatial locations of the content elements in the composition layout layer 830 and include the description of the content element in the group section associated with that particular spatial location of the content element. For example, the content description layer 832 may include seven different groups of content elements, as performed for the composition layout layer 830. The content description layer 832 may include the description of each group of content elements in the section of the content entity 160 in accordance to the respective group number from the composition layout layer 830. The boundaries of each content group may be the same as shown in composition layout layer 830, and may border the description of each group of content elements in the content description layer 832. The content entities description system may index the content description information of each group of content element according to the spatial location of the respective group.

The content entities description system may determine the description of each group of content elements by coalescing the extracted text characters into words, sentences, lines, and paragraphs. The extracted text characters of content elements may be coalesced according to their spatial locations in the content entity 160. The content entities description system may determine the description of each group of content elements by decomposing any graphical content elements from the captured and normalized images of the content entity 160. A graphical element may be decomposed as a series of wireframes based on the defined shapes and contours of the graphical element. The set of wireframes may be displayed as dotted lines following the shape and contour of the key elements of the graphical element.

The graphical element may be decomposed into a graph representation. A decomposed 2D graphical element may use a X/Y framework, while a 3D graphical element may use a X/Y/Z framework. The graph representation of the graphical element may be of various sizes for better tracking and memorization. As an example, a graphical element of size ABC can be decomposed and virtualized into a scale down or a scale up representation based on the important elements of shapes and contours of the graphical element. A scale up representation may be two times (2×) bigger than the original size of the graphical element. A scale down representation may be two times (2×) smaller than the original size of the graphical element. Creating a scaled up or down representation of the graphical element may act as a virtual zoom in and zoom out function. This zoom in/out function may highlight particular elements of the graphical element to help a visually impaired user obtain a better understanding of the graphical element.

The description of each group of content element may include all words, sentences, lines, and/or paragraphs of text characters, and/or wireframes, graphical representations, and/or all associated information of graphical elements. The content entities description system may further generate a list 842 of the different groups of the content elements. The list 842 may include each group of content elements with the type of each group of content element, the description of each group of content element, and the group number of the group of content element according to the composition layout layer 830.

After the content description layer 832 has been created, the content entities description system may create a concepts and supplemental content layer 834. The concepts and supplemental content layer 834 may be created based on the composition layout layer 830 and the content description layer 832. The concepts and supplemental content layer 834 may use the spatial locations of the content elements in the composition layout layer 830 along. The content entities description system may use the descriptions of the content elements to search and assign supplemental content and concepts to each group of content element. The concepts and supplemental content layer 834 may include any supplemental content and/or concepts associated to each group of content element in the respective section of the concepts and supplemental content layer 834 in relation to the spatial location of the respective group of content element in the content entity 160. The content entities description system may index the supplemental content and concept information of each group of content element according to the spatial location of the respective group.

For example, the concepts and supplemental content layer 834 may include seven different groups of content elements, as performed for the composition layout layer 830. The concepts and supplemental content layer 834 may include the supplemental content and concepts associated to each group of content elements in the section of the content entity 160 in accordance to the respective group number from the composition layout layer 830. The boundaries of each content group may be the same as shown in composition layout layer 830, and may border the supplemental content and concepts of each group of content elements in the concepts and supplemental content layer 834.

The content entities description system may further generate a list 844 of the supplemental contents and concepts associated with each group of content element. The list may include each group of content element, such as "CE1," whether supplemental contents and/or concepts are associated with each group, and information of the supplemental content and/or concepts that are associated.

Figure 9:
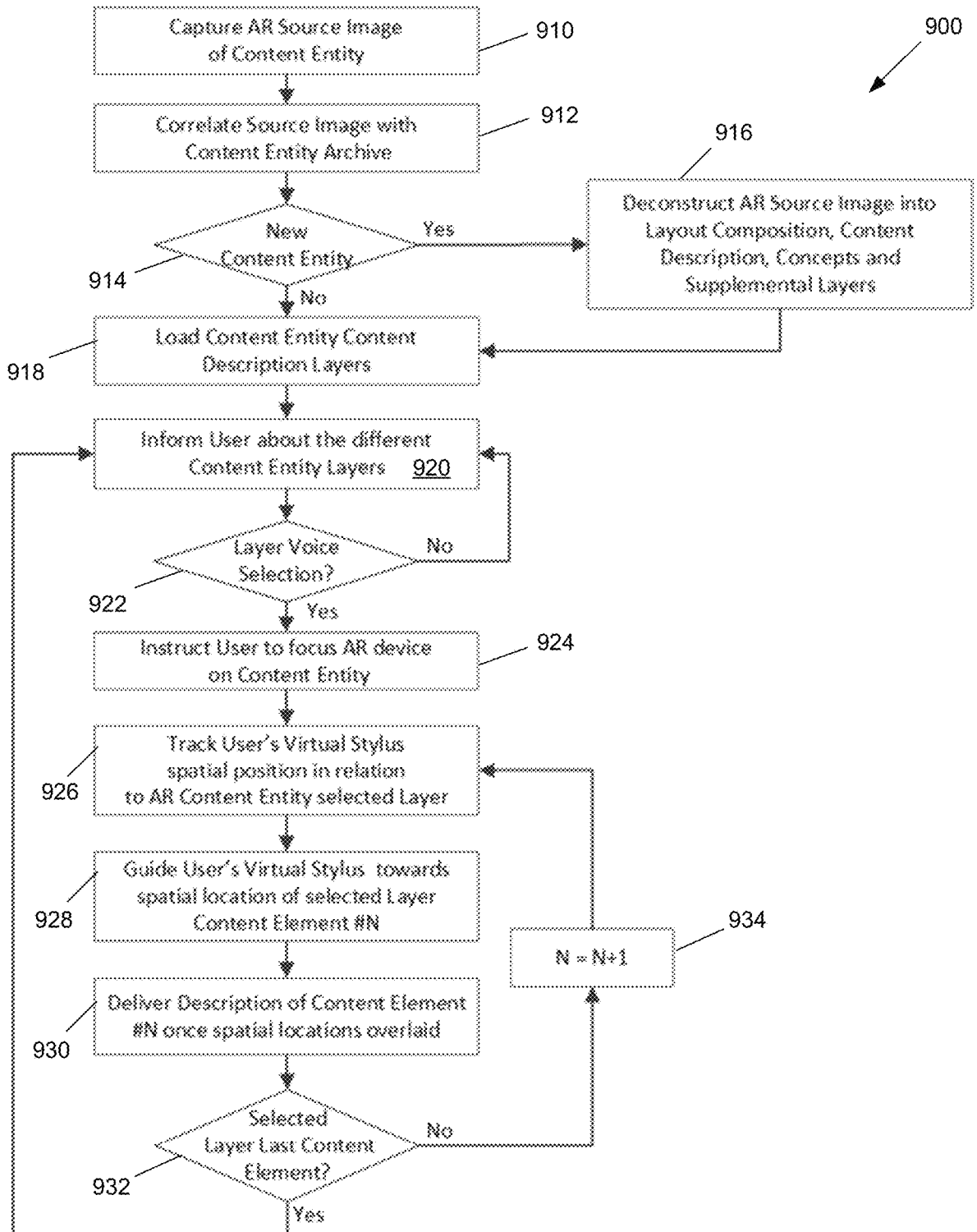
FIG. 9 illustrates an example process for guiding a visually impaired person to interact with captured augmented reality content entities in accordance with some embodiments.

FIG. 9 illustrates an example process 900 for guiding a visually impaired person to interact with captured content entities in the content entities description system. In some embodiments, the process 900 may be executed, for example, by the content entities description system 100 of FIG. 1 or the content entities description system 300 of FIG. 3. The process 700 may also be executed by the AR content entities description system 102 of FIG. 1 or the AR content entities description system 200 of FIG. 2. Although the process 700 may be executed by any number of different components and systems, to simply discussion, the process 700 will be described relative to the AR content entities description system 200 of FIG. 2 and, more particularly, the content entities description system 300 of FIG. 3. As described relative to FIG. 3, the content entities description system 300 includes a plurality of components and modules, including the AR content entities description system 200 of FIG. 2. The content entities description system 300 may be used to guide a visually impaired person, such as visually impaired user 150 of FIG. 1, to interact with captured content entities.

In block 910, the content entities description system may capture AR source image of content entity. The content entities description system may capture images of observable content entities, such as observable 2D/3D content entities 160, using one or more cameras 336 of the embedded systems 330. The embedded systems may be an AR device, such as AR connected device 140, that is being worn/held and/or used by a person, such as visually impaired user 150. One or more of the captured images may be the AR source image of the content entity 160.

In block 912, the content entities description system may correlate the AR source image of content entity 160 with the content entity archive. The content entity archive may be the content entities knowledge library 370. The content entity archive may include a database of all of the content entities that have been captured and analyzed by the content entities description system. The content entities description system may search through the content entity archive to determine if the content entity and all associated information are stored in the content entity archive.

In block 914, the content entities description system may determine if the content entity 160 is new content entity. The content entities description system may determine if any content entity stored in the content entity archive matches the content entity 160. If the content entity archive does contain a content entity that is a complete match to the content entity 160, then proceed to block 918. If the content entity archive does not contain a complete match to the content entity 160, then the content entity 160 is a new content entity. Proceed to block 916 if content entity 160 is a new content entity.

In block 916, the content entities description system may deconstruct the AR source image into content layers. Content layers may include a layout composition layer, a content description layer, and a concepts and supplemental layer. As illustrated previously in FIG. 8, the content entities description system may normalizing the captured images of content entity 160, including the AR source image. After normalizing the captured images of the content entity 160, the content entities description system may extract the content elements embedded in the normalized images. The content elements of the content entity 160 may include text characters, graphical characters, paragraphs, columns, headers, captions, and shapes.

The content entities description system may further deconstruct the normalized images to create a composition layout layer of the content entity 160. The content entities description system may determine the spatial location of the content elements of the captured content entity 160 based on the information determined from extracting the content elements. The composition layout layer may be sectionalized into various groups according to the information from the extraction. Each section of content elements may be shown in the composition layout layer with dotted lines, shapes, and boundaries.

Using the information gathered from extracting the content elements and creating the composition layout layer of the content entity 160, the content entities description system may create a composition list of all of the extracted content elements. The composition list may include the type of each content element and the spatial location of each content element based on the composition layout layer. The composition list may associate particular content elements together according to their respective spatial location.

After the composition layout layer has been created, the content entities description system may create a content description layer. The content description layer may be created based on the composition layout layer. The content description layer may use the spatial locations of the content elements in the composition layout layer and include the description of the content element in the group section associated with that particular spatial location of the content element. For example, the content description layer may include seven different groups of content elements, as performed for the composition layout layer. The content description layer may include the description of each group of content elements in the section of the content entity in accordance to the respective group number from the composition layout layer. The boundaries of each content group may be the same as shown in composition layout layer, and may border the description of each group of content elements in the content description layer. The content entities description system may index the content description information of each group of content element according to the spatial location of the respective group.

The content entities description system may determine the description of each group of content elements by coalescing the extracted text characters into words, sentences, lines, and paragraphs. The extracted text characters of content elements may be coalesced according to their spatial locations in the content entity 160. The content entities description system may determine the description of each group of content elements by decomposing any graphical content elements from the captured and normalized images of the content entity 160. A graphical element may be decomposed as a series of wireframes based on the defined shapes and contours of the graphical element. The set of wireframes may be displayed as dotted lines following the shape and contour of the key elements of the graphical element.

The graphical element may be decomposed into a graph representation. A decomposed 2D graphical element may use a X/Y framework, while a 3D graphical element may use a X/Y/Z framework. The graph representation of the graphical element may be of various sizes for better tracking and memorization. As an example, a graphical element of size ABC can be decomposed and virtualized into a scale down or a scale up representation based on the important elements of shapes and contours of the graphical element. A scale up representation may be two times (2×) bigger than the original size of the graphical element. A scale down representation may be two times (2×) smaller than the original size of the graphical element. Creating a scaled up or down representation of the graphical element may act as a virtual zoom in and zoom out function. This zoom in/out function may highlight particular elements of the graphical element to help a visually impaired user obtain a better understanding of the graphical element.

The description of each group of content element may include all words, sentences, lines, and/or paragraphs of text characters, and/or wireframes, graphical representations, and/or all associated information of graphical elements. The content entities description system may further generate a description list of the different groups of the content elements. The description list may include each group of content elements with the type of each group of content element, the description of each group of content element, and the group number of the group of content element according to the composition layout layer.

After the content description layer has been created, the content entities description system may create a concepts and supplemental content layer. The concepts and supplemental content layer may be created based on the composition layout layer and the content description layer. The concepts and supplemental content layer may use the spatial locations of the content elements in the composition layout layer along. The content entities description system may use the descriptions of the content elements to search and assign supplemental content and concepts to each group of content element. The concepts and supplemental content layer may include any supplemental content and/or concepts associated to each group of content element in the respective section of the concepts and supplemental content layer in relation to the spatial location of the respective group of content element in the content entity 160. The content entities description system may index the supplemental content and concept information of each group of content element according to the spatial location of the respective group.

For example, the concepts and supplemental content layer may include seven different groups of content elements, as performed for the composition layout layer. The concepts and supplemental content layer may include the supplemental content and concepts associated to each group of content elements in the section of the content entity 160 in accordance to the respective group number from the composition layout layer. The boundaries of each content group may be the same as shown in composition layout layer, and may border the supplemental content and concepts of each group of content elements in the concepts and supplemental content layer.

The content entities description system may further generate a concepts and supplemental list of the supplemental contents and concepts associated with each group of content element. The concepts and supplemental list may include each group of content element, such as "CE1," whether supplemental contents and/or concepts are associated with each group, and information of the supplemental content and/or concepts that are associated.

In block 918, the content entities description system may load the content entity content description layer. The content entities description system may load the generated content description layer of the content entity 160. Loading the content description layer may include extracting the content description layer of the content entity 160 from the content entity archive, if the content entity 160 has been previously captured and analyzed. Loading the content description layer may include storing the content description layer into the content description module 326 of the content entities description layers component 320 of FIG. 3.

In block 920, the content entities description system may inform the user about the various content entity layers that are available. The content entities description system may inform the user of the availability of the layout composition layer, content description layer, and concepts and supplemental layer. The content entities description system may inform the user, such as visually impaired user 150, using one or more components, such as the sound engine 342 of the interactivity systems 340 of FIG. 1. The content entities description system may inform the visually impaired user 150 using speech generated by the speech engine 346 of the interactivity systems 340.

In block 922, the content entities description system may select an available content layer according to the voice commands. The content entities description system may send an audio message to the visually impaired user 150. The audio message may include a combination of words, phrases and/or sentences. The audio message may ask the visually impaired user 150 to select a particular content layer amongst the available content layers. The content layers may include one or more layout composition layers, one or more content description layers, and/or one or more concepts and supplemental layers. The content entities description system may provide the audio message to the visually impaired user 150 using one or more components of the interactivity systems 340.

The visually impaired user 150 may provide a response back to the content entities description system. The response may be an audio message or a text message. The audio message response may be received by the content entities description system from the microphone 334 of the embedded systems 330, such as an AR device. The text message response may be received by the content entities description system from the sensors 332 of the embedded systems 330. The response may include a combination of words, phrases and/or sentences. If the content entities description system receives a response that does not select a content layer, or does not receive any response from the visually impaired user 150, then the content entities description system may conclude that the visually impaired person 150 chooses not to select a content layer. If the content entities description system concludes that the visually impaired user 150 does not select a content layer, then proceed to block 920. Otherwise, proceed to block to block 924.

In block 924, the content entities description system may instruct the visually impaired user to focus the AR device on the content entity 160. After the visually impaired user 150 has provided an audio response of a selected content layer, the content entities description system may instruct the visually impaired user to focus the camera(s) 336 of the AR device, such as embedded systems 330 and AR connected device 140, towards to content entity 160. The content entities description system may send the instructions to the visually impaired user 150 as an audio message. The audio message may include a combination of words, phrases and/or sentences. The content entities description system may provide the audio message to the visually impaired user 150 using one or more components of the interactivity systems 340.

In block 926, the content entities description system may track the visually impaired user's 150 virtual stylus spatial position in relation to the AR content entity selected layer. In addition to the instructions provided to the visually impaired user 150, the content entities description system may also provide an audio message to the visually impaired user 150 to use a physical stylus to interact with the content entity 160 while focusing the camera(s) 336 of the AR device on the content entity 160. The audio message may include a combination of words, phrases and/or sentences. The content entities description system may provide the audio message to the visually impaired user 150 using one or more components of the interactivity systems 340.

As the visually impaired user 150 interacts with the content entity 160 using a physical stylus, the content entities description system may track the physical stylus. The content entities description system may use the virtual stylus spatial tracker module 356 of the stylus tracking & guiding systems 350 to track the spatial location of the physical stylus. A physical stylus may include a finger, a pen, a ruler, or any other object associated with and used by the visually impaired user's 150 person. The physical stylus may be used by the visually impaired user 150 to interact with an observable 2D/3D content entity, such as observable 2D/3D content entities 160.

The visually impaired user 150 may use a physical stylus to interact with the extracted content elements of the observable 2D/3D content entities 160. The virtual stylus spatial tracker module 356 may track the position of the physical stylus in real-time using camera(s) 336 of the embedded systems 330. Using the tracked position of the physical stylus, the virtual stylus spatial tracker module 356 may digitalize the physical stylus into a virtual stylus. The virtual stylus may provide location data of the physical stylus to the content entities description system 300.

The content entities description system may further use the stylus overlay composition tracker module 354 of the stylus tracking & guiding systems 350 to correlate the spatial location of the tip of the physical stylus. While the visually impaired user 150 is using the physical stylus on the surface of the observable 2D/3D content entity 160, the stylus overlay composition tracker module 354 may correlate the spatial location of the tip of the physical stylus to the spatial mapping of the content entity 160 in a digital domain. The correlated data may provide additional information of the content entity 160 based on the point of view, angle and speed of movement of the physical stylus as it is used on the surface of the content entity 160. The correlated data may be used by the content entities description system to analyze the content entity 160. The content entities description system may use the correlated data to generate a string of dots to be overlaid onto a digital mapping of the content entity 160. Each dot may be a reflection of the real-time location of the physical stylus obtained by the virtual stylus spatial tracker module 356.

In block 928, the content entities description system may guide the visually impaired user's 150 virtual stylus towards spatial location of selected content elements. The content entities description system may use the overlay guiding data analyzer module 352 of the stylus tracking & guiding systems 350 to guide a virtual stylus of a visually impaired user 150 to selected content elements. The overlay guiding data analyzer module 352 may determine a range between the spatial location of a dot generated using the correlated data and the spatial location of content elements within the content entity 160. As previously explained, the stylus overlay composition tracker module 354 may use correlated data to generate a string of dots to be overlaid onto a digital mapping of the content entity 160. The overlay guiding data analyzer module 352 may use the correlated data and string of dots to determine a range between the spatial location of a dot and the spatial location of content elements within the content entity 160. The spatial location of content elements in the content entity 160 may be determined by the spatial composition deconstruction module 313 of the content entities processing systems 310 of the content entities description system.

The determined range between the spatial locations of a dot and content elements of the content entity 160 may be used to determine if the spatial location of the physical stylus of the virtually impaired user 150 is at or near the location of a content element. The content entities description system 300 may use the spatial tracker guiding feedback module 358 to translate the determined range into feedback for the visually impaired user 150. The spatial tracker guiding feedback module 358 may generate feedback according to how close or far the spatial location of the physical stylus is based on the determined range.

In one embodiment, if the determined range is zero, where the spatial location of the physical stylus is at the spatial location of a particular content entity, the spatial tracker guiding feedback module 358 may generate feedback to notify the visually impaired user 150 of the content element that is being pointed at using the physical stylus. The content entities description system 300 may then obtain associated information of the particular content element from the content entities description layer component 320 and provide the associated information to the visually impaired user 150 using the sound engine 342 of the interactivity systems 340.

In another embodiment, if the determined range is small, the spatial tracker guiding feedback module 358 may generate feedback to guide the visually impaired user 150 towards the closest content element based on the spatial location of the physical stylus. The content entities description system 300 provide the feedback to the visually impaired user 150 using the sound engine 342 of the interactivity systems 340. The feedback may be audio messages, sounds, tones, or any other types of audio, either individually or in combination. As an example, the feedback may be speech guidance that includes audio messages to be provided to the visually impaired user 150, such as "Move your Stylus a little bit to the left, right, up, down to get the description of the "ABC Content Element." As another example, the feedback may be sound guidance that includes a higher or lower pitch note to indicate the relative proximity of the physical stylus to the closest content element of the content entity 160.

In block 930, the content entities description system may deliver the description of content element. After the spatial locations of the physical stylus has been overlaid onto a digital mapping of the content entity 160, the content entities description system may determine the location of the physical stylus in relation to content elements of the content entity 160, as previously explained in block 928. Once the physical stylus has reached a particular content element, the content entities description system may deliver the description of the particular content element to the visually impaired user 150. The content entities description system may deliver the description of the particular content entity as an audio message. The audio message may include a combination of words, phrases and/or sentences. The content entities description system may provide the audio message to the visually impaired user 150 using one or more components of the interactivity systems 340.

In block 932, the content entities description system may determine if the selected content layer contains any remaining content elements to be described. After the content entities description system has provided the full description of a content element in the content entity 160, the content entities description system may determine if the selected content layer has any other content elements that have yet to be described to the visually impaired user 150. If the content entities description system determines that there are other content elements in the content entity 160 that have not yet been described to the visually impaired user, the content entities description system may proceed to block 934. If the content entities description system determines that there are no other content elements in the content entity 160 that have not already been described, then the content entities description system may proceed to block 920.

In block 934, the content entities description system may determine the next content element in the content entity to describe. After the content entities description system determines that other content elements in the content entity 160 have yet to be described to the visually impaired user 150, the content entities description system may determine the next content element in the content entity 160 to describe. The content entities description system may determine the order number of the selected content element that was just described to the visually impaired user 150. In one embodiment, the content entities description system may determine the order number of the selected content element by determining the order number that is associated with the selected content element. In another embodiment, the content entities description system may determine the order number of the selected content element based on the spatial location of the selected content element in relation to the other content elements in the content entity 160.

After determining the order number of the selected content element, the content entities description system may select the content element that is next in order. In one embodiment, the content element that is next in order may have an order number that is one variable more than the order number of the selected content element. In another embodiment, the content element that is next in order may have a spatial location in relation to the other content elements in the content entity 160 that make it next in order after the selected content element. After the next content element has been determined, the content entities description system may proceed to block 926.

Figure 10A:
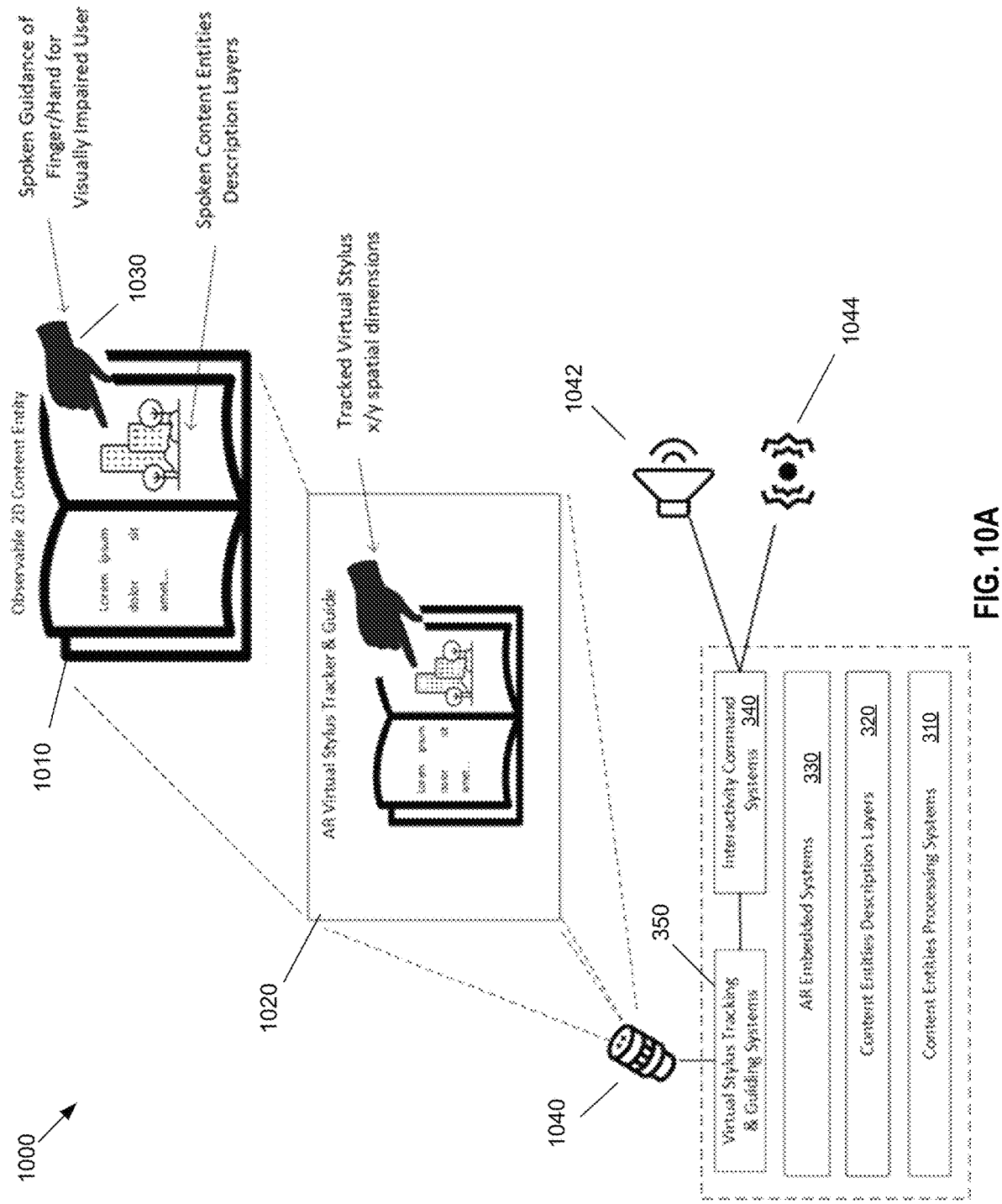
FIG. 10A illustrates an example diagram of a visually impaired person interacting with an observable 2D content entity with the assistance of an AR device in accordance with some embodiments.

FIG. 10A illustrates an example diagram 1000 of a visually impaired user interacting with an observable 2D content entity using the content entities description system. The content entities description system may be the content entities description system 100 in FIG. 1 and/or the content entities description system 300 in FIG. 3. Here, the content entities description system may use a camera(s), such as camera(s) 336 of the embedded systems 330 in an augmented reality connected device 140, to capture images of an observable 2D content entity 1010. The captured images of the observable 2D content entity 1010 may then be normalized. Normalizing the captured images may determine that the 2D content entity 1010 being observed are two pages of a printed textbook, with text and graphical elements. Examples of the 2D content entity 1010 may include textbooks, books, magazines, newspapers, and similar content.

The visually impaired user may use a physical stylus 1030, such as a finger as shown in example diagram 1000, to navigate around the 2D content entity 1010. The location of the physical stylus 1030 may indicate where in the 2D content entity 1010 the visually impaired user is focused on and/or interested in. As the visually impaired user is navigating around the 2D content entity 1010, the content entities description system may use one or more components, such as sensor 1040, of the virtual stylus tracking and guidance systems 350 to track the movements of the physical stylus 1030. The content entities description system may use the information gathered from captured and normalized images of the 2D content entity 1010, extracted content elements of the 2D content entity 1010, and information obtained from the sensor 1040 of the virtual stylus tracking and guidance systems 350 to generate a tracked virtual stylus display 1040. The tracked virtual stylus display 1040 may represent a mental representation of the 2D content entity 1010 and the location of the physical stylus 1030.

The content entities description system may include a plurality of different modes where each mode may provide different outputs to the visually impaired person. An output may include an audio signal, an audio message, vibrations and/or a physical pressure, such as a tap, to the visually impaired person. In an exploratory mode, the content entities description system may track the location of the physical stylus 1030. The location of the physical stylus 1030 may indicate the location on the 2D content entity 1010 that the visually impaired user is interested in. The content entities description system may determine the spatial location of the physical stylus 1030 in relation to the spatial locations of the content elements in the 2D content entity 1010. The content entities description system may provide the outputs to the visually impaired user where the outputs include descriptions of the content elements that have a spatial location at or close to the spatial location of the physical stylus 1030.

Outputs may be provided to the visually impaired user using one or more components, such as speaker 1042 and sensor 1044, of the interactivity command systems 340.

In a guided mode, the content entities description system may guide the visually impaired user about the 2D content entity 1010 according to a goal. The goal may be selected by the visually impaired user by providing the content entities description system with an audio message indicating the goal. As an example, the goal may be to describe the content elements of the 2D content entity 1010 in order of location. The content entities description system may guide the visually impaired user towards content elements in the 2D content entity 1010 based on the order of the content elements. The order of the content elements may be based on the spatial locations of each content element in relation to one another and the layout of the 2D content entity 1010. The content entities description system may provide outputs to the visually impaired user where the outputs guide the visually impaired user through the 2D content entity 1010. Outputs may be provided to the visually impaired user using one or more components, such as speaker 1042 and sensor 1044, of the interactivity command systems 340. The content entities description system may first guide the visually impaired user to the spatial location of the content element at the top of the order amongst the content elements. The content entities description system may track the spatial location of the physical stylus 1030 and provide outputs with updated directions to efficiently navigate the visually impaired user to each content element in the 2D content entity 1010. The content entities description system may provide the descriptions of each content element in the 2D content entity 1010 as the spatial location of the physical stylus 1030 moves to or near the spatial locations of each content element.

In a testing mode, the content entities description system may provide an interactive, voice-driven testing exercise to the visually impaired user. The exercise may be based on one or more supplemental contents in the supplemental content layer of the 2D content entity 1010. The content entities description system may extract particular content elements from a supplemental content in the supplemental content layer. As an example, if the supplemental content is an SAT test, the content entities description system may extract the questions from the supplemental content and associate each question with the related content element of the 2D content entity 1010. The content entities description system may then send outputs of the questions associated with a particular content element after the content entities description system has provided the description of the particular content element to the visually impaired user.

Figure 10B:
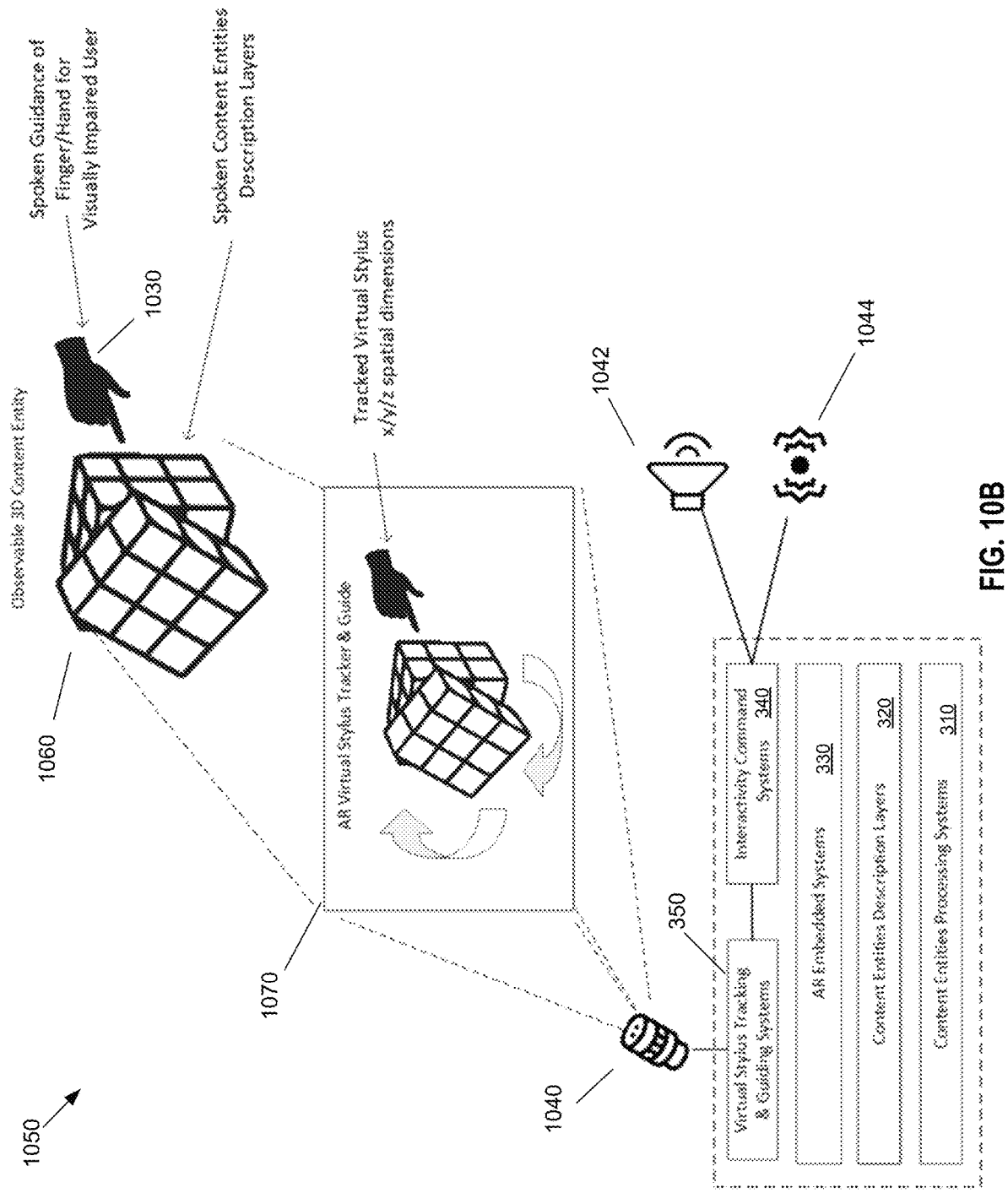
FIG. 10B illustrates an example diagram of a visually impaired person interacting with a 3D content entity with the assistance of an AR device in accordance with some embodiments.

FIG. 10B illustrates an example diagram 1050 of a visually impaired user interacting with an observable 3D content entity using the content entities description system. The content entities description system may be the content entities description system 100 in FIG. 1 and/or the content entities description system 300 in FIG. 3. Here, the content entities description system may use a camera(s), such as camera(s) 336 of the embedded systems 330 in an augmented reality connected device 140, to capture images of an observable 3D content entity 1060. The captured images of the observable 3D content entity 1060 may then be normalized. Normalizing the captured images may determine that the 3D content entity 1060 being observed is a Rubik's cube, as shown in example diagram 1050.

The visually impaired user may use a physical stylus 1030, such as a finger as shown in example diagram 1050, to navigate around the 3D content entity 1060. The location of the physical stylus 1030 may indicate where in the 3D content entity 1060 the visually impaired user is focused on and/or interested in. As the visually impaired user is navigating around the 3D content entity 1060, the content entities description system may use one or more components, such as sensor 1040, of the virtual stylus tracking and guidance systems 350 to track the movements of the physical stylus 1030. The content entities description system may use the information gathered from captured and normalized images of the 3D content entity 1060 and information obtained from the sensor 1040 of the virtual stylus tracking and guidance systems 350 to generate a tracked virtual stylus display 1070. The tracked virtual stylus display 1070 may represent a mental representation of the 3D content entity 1060 and the location of the physical stylus 1030.

With regards to a 3D content entity 1060, the content entities description system may provide outputs that include directions of how to use the 3D content entity 1060 and descriptions explaining the 3D content entity 1060. The content entities description system may capture and analyze images of the 3D content entity 1060 to determine what the 3D content entity 1060 is. The content entities description system may access a content entity database, such as knowledge library 370 of FIG. 1, that includes stored content entities. The stored content entities may be content entities that have previously been captured and analyzed by the content entities description system. A stored content entity may include all associated information describing the stored content entity and instructions of how to use the stored content entity. The associated information describing the stored content entity may include a plurality of content layers, content elements, images, etc.

The content entities description system may search through the content entity database for stored content entities that are the same or similar to the 3D content entity 1060 according to the captured images and determined analysis of the 3D content entity 1060. The content entities description system may extract the stored content entities that are the same or similar to the 3D content entity 1060. The content entities description system may use the information associated with the stored content entities to generate descriptions of the 3D content entity 1060. The generated descriptions of the 3D content entity 1060 may include a plurality of content layers, content elements, images, etc. The generated descriptions of the 3D content entity 1060 may include the spatial locations of the content elements in the 3D content entity 1060.

If the content entities description system is unable to find any stored content entities in the content entity database that are the same or similar to the 3D content entity 1060, the content entities description system may generate descriptions of the 3D content entity 1060 according to the captured images of the 3D content entity 1060. The content entities description system may need more images to generate the description of the 3D content entity 1060. The content entities description system may send outputs to the visually impaired user requesting for more photos of the 3D content entity 1060. Outputs may be provided to the visually impaired user using one or more components, such as speaker 1042 and sensor 1044, of the interactivity command systems 340.

The content entities description system may track the location of the physical stylus 1030. The location of the physical stylus 1030 may indicate the current status of the 3D content entity 1060. The location of the physical stylus 1030 may indicate the spatial location of the 3D content entity 1060 that the visually impaired user is focused on or interested in. The content entities description system may determine the spatial location of the physical stylus 1030 in relation to the spatial location of the 3D content entity 1060. The spatial location of the 3D content entity 1060 may be determined based on the captured and analyzed images of the 3D content entity 1060 and information obtained from the sensor 1040 of the virtual stylus tracking and guidance systems 350.

The content entities description system may include a plurality of different modes where each mode may provide different outputs to the visually impaired person. In an exploratory mode, the content entities description system may provide the outputs to the visually impaired user where the outputs include descriptions of the content elements of the 3D content entity 1060 that have a spatial location at or close to the spatial location of the physical stylus 1030. As an example, the content elements of 3D content entity 1060 may be each square block of the Rubik's cube and the colors on each square block. The content elements in the outputs may be provided to the visually impaired user using one or more components, such as speaker 1042 and sensor 1044, of the interactivity command systems 340.

In a guided mode, the content entities description system may guide the visually impaired user about the 3D content entity 1060 according to a goal. The goal may be selected by the visually impaired user by providing the content entities description system with an audio message indicating the goal. As an example, the goal may be to solve the 3D content entity 1060, which in this case, is to solve the Rubik's cube by moving each square block of the Rubik's cube until each side of the Rubik's cube contains only one respective color. The content entities description system may guide the visually impaired user towards spatial locations of content elements of the 3D content entity 1060 based on the spatial locations of the square blocks and the colors on each square block. The order of the content elements that the content entities description system may guide the visually impaired user may be based on the spatial locations of each content element in relation to one another and the layout of the 3D content entity 1060.

The content entities description system may provide outputs to the visually impaired user where the outputs guide the visually impaired user through the 3D content entity 1060. Outputs may be provided to the visually impaired user using one or more components, such as speaker 1042 and sensor 1044, of the interactivity command systems 340. The content entities description system may first guide the visually impaired user to the spatial location of the content element at the top of the order amongst the content elements in order to complete the goal. The content entities description system may track the spatial location of the physical stylus 1030 and provide outputs with updated directions to efficiently navigate the visually impaired user to each content element in the 3D content entity 1060. The content entities description system may provide the descriptions of each content element in the 3D content entity 1060 as the spatial location of the physical stylus 1030 moves to or near the spatial locations of each content element.

In a testing mode, the content entities description system may provide an interactive, voice-driven testing exercise to the visually impaired user. The exercise may be based on one or more supplemental contents in the supplemental content layer of the 3D content entity 1060. The content entities description system may extract particular content elements from a supplemental content in the supplemental content layer. The supplemental content layer may include supplemental contents of similar content entities to the 3D content entity 1060 that are found in the content entity database. As an example, if the supplemental content is guide of a game for the Rubik's cube, the content entities description system may extract the instructions from the supplemental content and associate each instruction with the related content element of the 3D content entity 1060. The content entities description system may then send outputs of the instructions associated with a particular content element after the content entities description system has guided the physical stylus of the visually impaired user to a particular content element and provided the description of the particular content element to the visually impaired user.

Figure 11:
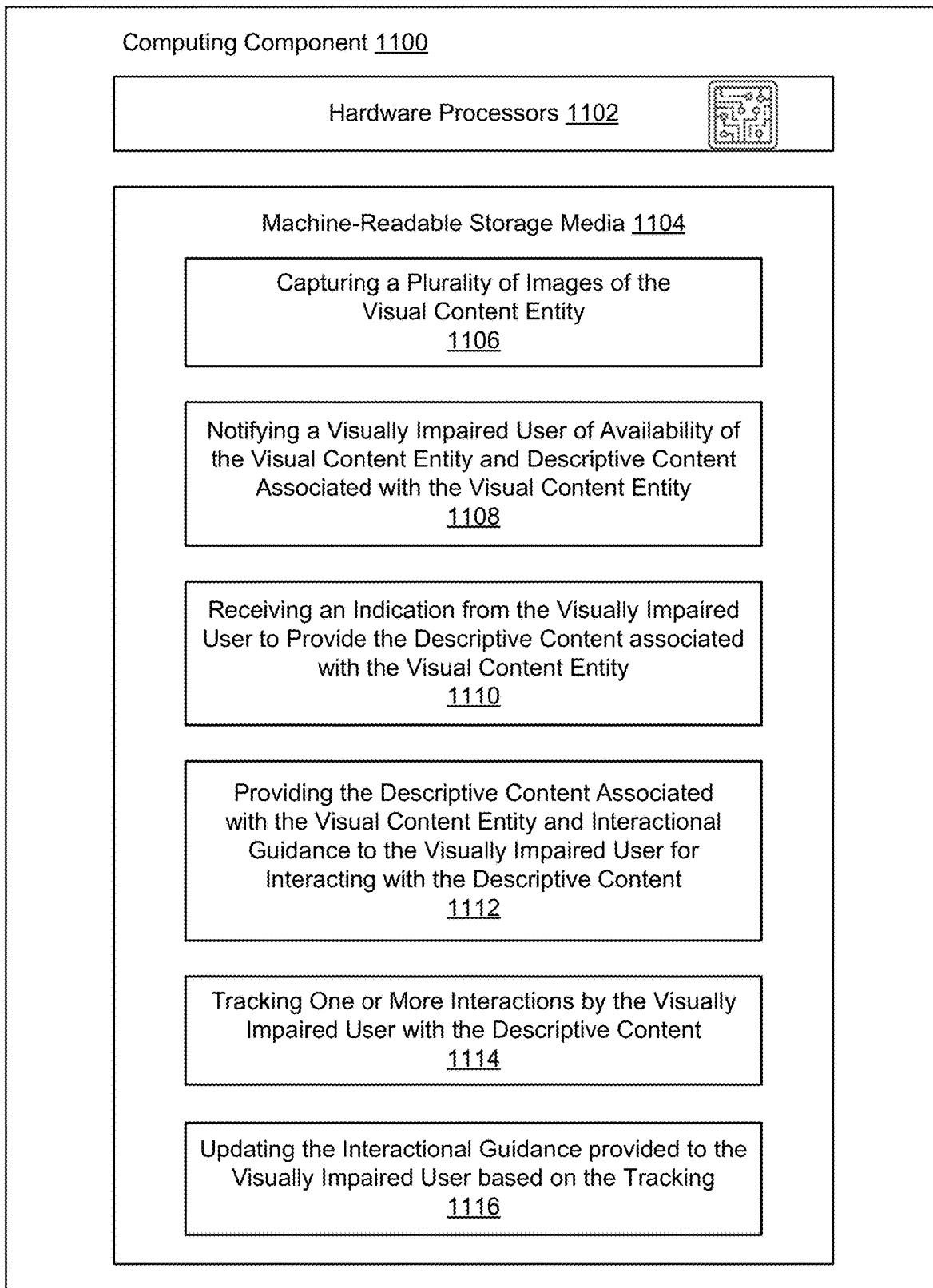
FIG. 11 is an example computing component that includes one or more hardware processors and machine-readable storage media storing a set of machine-readable/machine-executable instructions that, when executed, cause the one or more hardware processors to perform an illustrative method for implementing a tensorized optical neural network according to some embodiments.

FIG. 11 illustrates a computing component 1100 that includes one or more hardware processors 1102 and machine-readable storage media 1104 storing a set of machine-readable/machine-executable instructions that, when executed, cause the hardware processor(s) 1102 to perform an illustrative method for assisting a visually impaired person in interacting with a visual content entity. It should be appreciated that there can be additional, fewer, or alternative steps performed in similar or alternative orders, or in parallel, within the scope of the various examples discussed herein unless otherwise stated. FIG. 11 summarizes and further elaborates on some aspects previously described.

At step 1106, the hardware processor(s) 1102 may execute machine-readable/machine-executable instructions stored in the machine-readable storage media 1104 to capture a plurality of images of a visual content entity. A plurality of images of a visual content entity may be captured by an augmented reality (AR) content entity description system. The AR content entity description system may capture images of a visual content entity using a camera(s). The camera may be embedded in an AR device that is connected to and/or associated with the AR content entity description system. The AR device may be worn/held and/or used by the virtually impaired user. The visual content entity may be a 2D or 3D content entity. A 2D content entity may a textbook, document, and image, either printed or digital. A 3D content entity may be a real life object, such as a table, chair, ball, etc.

After images have been captured by the AR content entity description system, the images may be analyzed to determine the quality of the images. If the images are analyzed to have a quality that is below a quality threshold, the AR content entity description system may instruct the visually impaired user to capture more images of the visual content entity. The AR content entity description system may instruct the visually impaired user by sending outputs to the visually impaired user via the AR device. The outputs may comprise audio messages of one or more words and/or tones.

At step 1108, the hardware processor(s) 1102 may execute machine-readable/machine-executable instructions stored in the machine-readable storage media 1104 to notify a visually impaired user of the availability of the visual content entity and descriptive content associated with the visual content entity. After images have been captured and analyzed to have a quality over the quality threshold, the images may be compared to other images of content entities stored in a content entity database. If it is determined that the images match at least one stored image, then the descriptive content associated with the stored image may be extracted from the content entity database. If it is determined that the images do not match at least one stored image, then the descriptive content may be generated using the captured images of the content entity.

The captured images may be used to extract information of the visual content entity. The information of the visual content entity may be used to generate descriptive content of the visual content entity. The descriptive content may include the visual content entity, a composition layout layer, a content description layer and/or a concept and supplemental content layer. Each layer may be associated with the visual content entity.

The composition layout layer may include information of the layout of the visual content entity in accordance to the descriptive content elements in the visual content entity. The composition sections of the visual content entity may be extracted. Each composition section may comprise descriptive content elements associated with the visual content entity. The spatial location corresponding to each composition section may be determined and used to order the composition sections. The order of the composition sections may be determined based on the spatial locations of each composition section according to how the spatial locations of each composition section relates to the layout of the visually content entity and all other composition sections. The spatial location of each composition section, along with the composition sections and an order number of each composition section, may be used to create the composition layout layer.

The content description layer may include information of the descriptive content elements, including text characters and graphics, that are in the virtual content entity. The text characters and graphics may be extracted from the captured images of the visual content entity. The text characters and graphics may be analyzed to identify terms that are in the text characters and correlate one or more of the terms to the graphics. Definitions of one or more terms may be retrieved from a knowledge database. The terms, graphics, and definitions may be used to create the content description layer.

The concept and supplemental content layer may include concepts and supplemental contents associated with the visual content entity. A supplemental content may provide additional descriptions and information of the content entity. A concept to a content element may be a particular subject or topic that may be representative of the substance of the content element. Content elements may be extracted from the captured images of the visual content entity. The content elements may be used to search through the knowledge database to identify concepts and supplemental content that may be associated to the visual content entity. The concepts and supplemental content that are found and are associated to the visual content entity may be used to generate the concept and supplemental content layer.

At step 1110, the hardware processor(s) 1102 may execute machine-readable/machine-executable instructions stored in the machine-readable storage media 1104 to receive an indication from the visually impaired user to provide the descriptive content associated with the visual content entity. After the visually impaired user has been notified of the availability of the visual content entity and associated descriptive content, the visually impaired user may send a response. The response may be an audio message received by the AR device through a microphone(s). After a response has been received, the response may be analyzed to determine the content of the response. If it is determined that the response includes an indication from the visually impaired user to provide the descriptive content associated with visual content entity, proceed to step 1112.

At step 1112, the hardware processor(s) 1102 may execute machine-readable/machine-executable instructions stored in the machine-readable storage media 1104 to provide the descriptive content associated with the visual content entity and interactional guidance to the visually impaired user for interacting with the descriptive content. Upon receiving a response that includes an indication to provide the descriptive content to the visually impaired user, the descriptive content associated with the visual content entity may be provided. To provide the descriptive content, one of the content layers may be selected. The content layer that is selected may be based on the response received that included the indication to provide the descriptive content. The content layer that is selected may be based on another audio message received from the visually impaired user that includes an indication of which content layer to select. Once a content layer is selected, the content layer and its associated information may be delivered to the visually impaired user as outputs via the AR device.

At step 1114, the hardware processor(s) 1102 may execute machine-readable/machine-executable instructions stored in the machine-readable storage media 1104 to track one or more interactions by the visually impaired user with the descriptive content. As the content layer and its associated information is being delivered to the visually impaired user as outputs via the AR device, the AR device may track the interactive movements of the visually impaired user. The visually impaired user may interact with the descriptive content of the content layer and its associated information by using a physical stylus, such as a finger, pen, or other object associated with the visually impaired user's person. The visually impaired user may use the physical stylus to interact with the visual content entity by moving along the visual content entity to understand the location of the descriptive content elements in the visual content entity. As the visually impaired user is interacting with the visual content entity and/or content layer, and receiving the outputs of the selected content layer and its associated information, the AR device may track the interactive movements of the visually impaired user.

At step 1116, the hardware processor(s) 1102 may execute machine-readable/machine-executable instructions stored in the machine-readable storage media 1104 to update the interactional guidance provided to the visually impaired user based on the tracking. The AR device may monitor the spatial locations of a physical stylus, such as any physical object, that is associated with the visually impaired user. The spatial locations of the physical stylus may be tracked and compared with the spatial locations of the visual content entity and the descriptive content elements contained within. As the physical stylus of the visually impaired person is moving along the visual content entity, the AR content entity description system may provide outputs to the visually impaired user that include instructions. The instructions may direct the visually impaired user to move the physical stylus to particular spatial locations of the visual content entity where particular descriptive content elements are located. The instructions may be updated according to the movements of the physical stylus to provide accurate directions to the visually impaired user. Outputs including descriptions of a content layer and its associated information may be provided according to the location of the physical stylus on the visual content entity.

Figure 12:
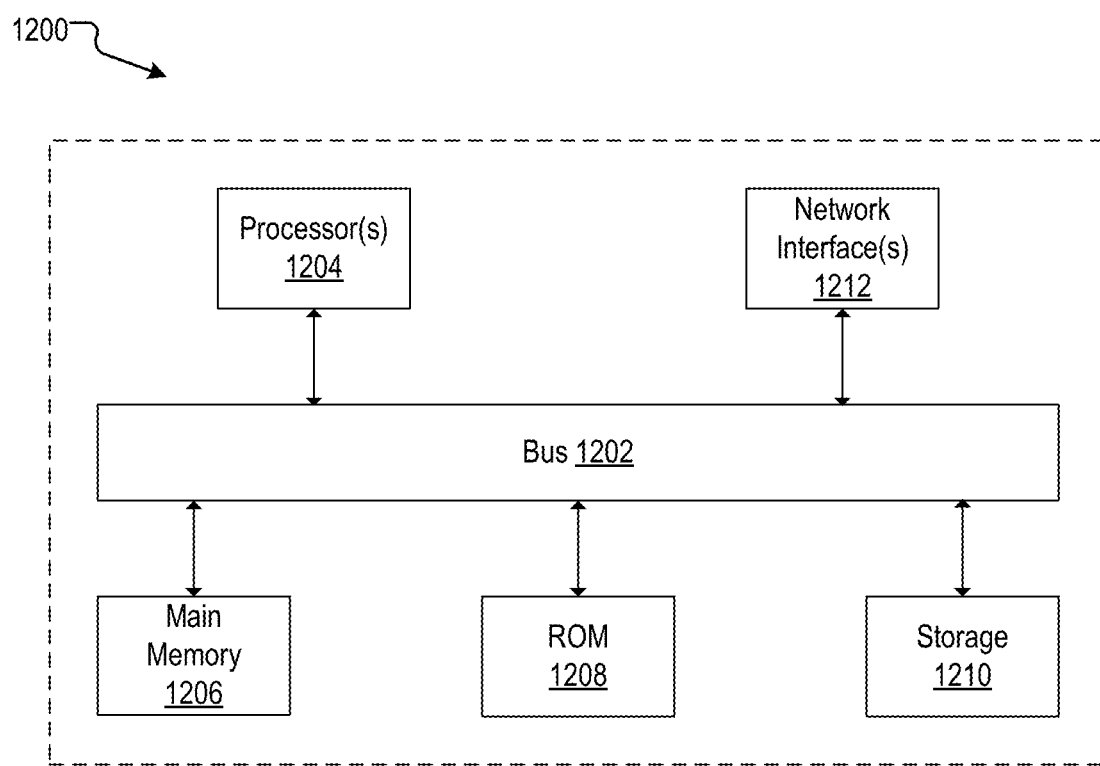
FIG. 12 illustrates a block diagram of an example computer system in which some embodiments herein may be implemented.

FIG. 12 illustrates a block diagram of an example computer system in which various examples may be implemented. In some cases, the computer system 1200 may be representative, for example, of any of the computing environment 100 of FIG. 1, computing environment 200 of FIG. 2, computing environment 300 of FIG. 3, and/or computing component 1100 or components thereof. The computer system 1200 may be an example of a client-server communication or similar device.

The components of the computer system 1200 may include any suitable physical form, configuration, number, type and/or layout. As an example, and not by way of limitation, the computer system 1200 may include an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a wearable or body-borne computer, a server, or a combination of two or more of these. Where appropriate, the computer system 1200 may include one or more computer systems; be unitary or distributed; span multiple locations; span multiple machines; or reside in a cloud, which may include one or more cloud components in one or more networks.

In the depicted embodiment, the computer system 1200 includes a bus 1202, hardware processors 1204, main memory 1206, read only memory (ROM) 1208, storage device 1210 and network interface 1212. Although a particular computer system is depicted having a particular number of particular components in a particular arrangement, this disclosure contemplates any suitable computer system having any suitable number of any suitable components in any suitable arrangement.

The computer system 1200 can include a bus 1202 or other communication mechanism for communicating information, one or more hardware processors 1204 coupled with the bus 1202 for processing information. Bus 1202 may include any combination of hardware, software embedded in a computer readable medium and/or encoded logic incorporated in hardware or otherwise stored (e.g., firmware) to couple components of the computer system 1200 to each other. As an example, and not by way of limitation, bus 1202 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 1202 may include any number, type and/or configuration of buses 1202, where appropriate. In some embodiments, one or more buses 1202 (which may each include an address bus and a data bus) may couple hardware processor(s) 1204 to main memory 1206. Bus 1202 may include one or more memory buses.

The hardware processor(s) 1204 may be, for example, one or more general purpose microprocessors, controller, or any other suitable computing device, resource, or combination of hardware, software and/or encoded logic operable to execute, either alone or in conjunction with other components. Such functionality may include providing various features discussed herein. In some embodiments, hardware processor(s) 1204 may include hardware for executing instructions. As an example, and not by way of limitation, to execute instructions, processor 1204 may retrieve (or fetch) instructions from an internal register, an internal cache, memory 1206, or storage 1210; decode and execute them; and then write one or more results to an internal register, an internal cache, memory 1206, or storage 1210.

In some embodiments, hardware processor(s) 1204 may include one or more internal caches for data, instructions, or addresses. This disclosure contemplates hardware processor(s) 1204 including any suitable number of any suitable internal caches, where appropriate. As an example, and not by way of limitation, hardware processor(s) 1204 may include one or more instruction caches, one or more data caches and one or more translation lookaside buffers (TLBs). Instructions in the instruction caches may be copies of instructions in main memory 1206 or storage device 1210 and the instruction caches may speed up retrieval of those instructions by hardware processor(s) 1204. Data in the data caches may be copies of data in main memory 1206 or storage device 1210 for instructions executing at hardware processor(s) 1204 to operate on; the results of previous instructions executed at hardware processor(s) 1204 for access by subsequent instructions executing at hardware processor(s) 1204, or for writing to main memory 1206, or storage device 1210; or other suitable data. The data caches may speed up read or write operations by hardware processor(s) 1204. The TLBs may speed up virtual-address translations for hardware processor(s) 1204. In some embodiments, hardware processor(s) 1204 may include one or more internal registers for data, instructions, or addresses. Depending on the embodiment, hardware processor(s) 1204 may include any suitable number of any suitable internal registers, where appropriate. Where appropriate, hardware processor(s) 1204 may include one or more arithmetic logic units (ALUs); be a multi-core processor; include one or more hardware processor(s) 1204; or any other suitable processor.

The computer system 1200 can also include a main memory 1206, such as a random access memory (RAM), cache and/or other dynamic storage devices, coupled to the bus 1202 for storing information and instructions to be executed by the hardware processor(s) 1204. The main memory 1206 may also be used for storing temporary variables or other intermediate information during execution of instructions by the hardware processor(s) 1204. Such instructions, when stored in a storage media accessible to the hardware processor(s) 1204, render the computer system 1200 into a special-purpose machine that can be customized to perform the operations specified in the instructions.

In some embodiments, main memory 1206 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Main memory 1206 may include one or more memories 1206, where appropriate. Main memory 1206 may store any suitable data or information utilized by the computer system 1200, including software embedded in a computer readable medium and/or encoded logic incorporated in hardware or otherwise stored (e.g., firmware). In some embodiments, main memory 1206 may include main memory for storing instructions for hardware processor(s) 1204 to execute or data for hardware processor(s) 1204 to operate on. In some embodiments, one or more memory management units (MMUs) may reside between hardware processor(s) 1204 and main memory 1206 and facilitate accesses to main memory 1206 requested by hardware processor(s) 1204.

The computer system 1200 can further include a read only memory (ROM) 1208 or other static storage device coupled to the bus 1202 for storing static information and instructions for the hardware processor(s) 1204. A storage device 1210, such as a magnetic disk, optical disk, or USB thumb drive (Flash drive), etc., can be provided and coupled to the bus 1202 for storing information and instructions.

As an example, and not by way of limitation, the computer system 1200 may load instructions from storage device 1210 or another source (such as, for example, another computer system) to main memory 1206. Hardware processor(s) 1204 may then load the instructions from main memory 1206 to an internal register or internal cache. To execute the instructions, hardware processor(s) 1204 may retrieve the instructions from the internal register or internal cache and decode them. During or after execution of the instructions, hardware processor(s) 1204 may write one or more results (which may be intermediate or final results) to the internal register or internal cache. Hardware processor(s) 1204 may then write one or more of those results to main memory 1206. In some embodiments, hardware processor(s) 1204 may execute only instructions in one or more internal registers or internal caches or in main memory 1206 (as opposed to storage device 1210 or elsewhere) and may operate only on data in one or more internal registers or internal caches or in main memory 1206 (as opposed to storage device 1210 or elsewhere).

In some embodiments, storage device 1210 may include mass storage for data or instructions. As an example, and not by way of limitation, storage device 1210 may include a hard disk drive (HDD), a floppy disk drive, flash memory, an optical disc, a magneto-optical disc, magnetic tape, or a Universal Serial Bus (USB) drive or a combination of two or more of these. Storage device 1210 may include removable or non-removable (or fixed) media, where appropriate. Storage device 1210 may be internal or external to the computer system 1200, where appropriate. In some embodiments, storage device 1210 may be non-volatile, solid-state memory. In some embodiments, storage device 1210 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage device 1210 may take any suitable physical form and may include any suitable number or type of storage. Storage device 1210 may include one or more storage control units facilitating communication between hardware processor(s) 1204 and storage device 1210, where appropriate.

Computer system 1200 can further include at least one network interface 1212. In some embodiments, network interface 1212 may include hardware, encoded software, or both providing one or more interfaces for communication (such as, for example, packet-based communication) among any networks, any network devices and/or any other computer systems. As an example, and not by way of limitation, network interface 1212 may include a network interface controller (NIC), network adapter, or the like, or a combination thereof, coupled to the bus 1202 for communicating the computer system 1200 to at least one network with an Ethernet or other wire-based network and/or a wireless NIC (WNIC) or wireless adapter for communicating with a wireless network.

Depending on the embodiment, network interface 1212 may be any type of interface suitable for any type of network for which computer system 1200 is used. As an example, and not by way of limitation, computer system 1200 can include (or communicate with) an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1200 can include (or communicate with) a wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. The computer system 1200 may include any suitable network interface 1212 for any one or more of these networks, where appropriate.

In some embodiments, network interface 1212 may include one or more interfaces for one or more I/O devices. One or more of these I/O devices may enable communication between a person and the computer system 1200. As an example, and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. Some embodiments may include any suitable type and/or number of I/O devices and any suitable type and/or number of network interface 1212 for them. Where appropriate, may include one or more drivers enabling hardware processor(s) 1204 to drive one or more of these I/O devices. Network interface 1212 may include one or more network interface 1212, where appropriate.

In general, the word "component," "modules," "engine," "system," "database," and the like, as used herein, can refer to logic embodied in hardware or firmware, or to a collection of software instructions, possibly having entry and exit points, written in a programming language, such as, for example, Java, C or C++. A software component or module may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices, such as the computing system 1200, may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of an executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 1200 may implement the techniques or technology described herein using customized hard-wired logic, one or more ASICs or FPGAs, firmware and/or program logic which in combination with the computer system 1200 that causes or programs the computer system 1200 to be a special-purpose machine. According to one or more examples, the techniques described herein are performed by the computer system 1200 in response to the hardware processor(s) 1204 executing one or more sequences of one or more instructions contained in the main memory 1206. Such instructions may be read into the main memory 1206 from another storage medium, such as the storage device 1210. Execution of the sequences of instructions contained in the main memory 1206 can cause the hardware processor(s) 1204 to perform process steps described herein. In alternative examples, hard-wired circuitry may be used in place of or in combination with software instructions.

Herein, reference to a computer-readable storage medium encompasses one or more tangible computer-readable storage media possessing structures. As an example, and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Some embodiments may include one or more computer-readable storage media implementing any suitable storage. In some embodiments, a computer-readable storage medium implements one or more portions of hardware processor(s) 1204 (such as, for example, one or more internal registers or caches), one or more portions of memory 620, one or more portions of storage device 1210, or a combination of these, where appropriate. In some embodiments, a computer-readable storage medium implements RAM or ROM. In some embodiments, a computer-readable storage medium implements volatile or persistent memory. In some embodiments, one or more computer-readable storage media embody encoded software.

The term "non-transitory media," and similar terms, as used herein refers to any media that store data and/or instructions that cause a machine to operate in a specific fashion. Such non-transitory media may comprise non-volatile media and/or volatile media. The non-volatile media can include, for example, optical or magnetic disks, such as the storage device 1210. The volatile media can include dynamic memory, such as the main memory 1206. Common forms of the non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The non-transitory media is distinct from but may be used in conjunction with transmission media. The transmission media can participate in transferring information between the non-transitory media. For example, the transmission media can include coaxial cables, copper wire and fiber optics, including the wires that comprise the bus 1202. The transmission media can also take a form of acoustic or light waves, such as those generated during radio-wave and infra-red data communications.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In some embodiments, encoded software includes one or more application programming interfaces (APIs) stored or encoded in a computer-readable storage medium. Some embodiments may use any suitable encoded software written or otherwise expressed in any suitable programming language or combination of programming languages stored or encoded in any suitable type or number of computer-readable storage media. In some embodiments, encoded software may be expressed as source code or object code. In some embodiments, encoded software is expressed in a higher-level programming language, such as, for example C, Perl, or a suitable extension thereof. In some embodiments, encoded software is expressed in a lower-level programming language, such as assembly language (or machine code). In some embodiments, encoded software is expressed in JAVA. In some embodiments, encoded software is expressed in Hyper Text Markup Language (HTML), Extensible Markup Language (XML), or other suitable markup language. The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in some embodiments and with various modifications as are suited to the particular use contemplated. Other substitutions, modifications, changes and omissions may be made in the design, operating conditions and arrangement of the embodiments without departing from the scope of this disclosure. Such modifications and combinations of the illustrative embodiments as well as other embodiments will be apparent to persons skilled in the art upon reference to the description. It is, therefore, intended that the appended claims encompass any such modifications or embodiments.

Depending on the embodiment, certain acts, events, or functions of any of the algorithms described herein can be performed in a different sequence, can be added, merged, or left out altogether (e.g., not all described acts or events are necessary for the practice of the algorithms) Moreover, in some embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

As used herein, the term "or" may be construed in either an inclusive or exclusive sense. Moreover, the description of resources, operations, or structures in the singular shall not be read to exclude the plural. Conditional language used herein, such as, among others, "can," "might," "may," "e.g.," and the like, unless specifically stated otherwise, or otherwise understood within the context as used, is generally intended to convey that some embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to some embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

The invention claimed is:

1. A method for assisting a visually impaired user in interacting with a visual content entity, comprising:
    capturing, by an augmented reality device worn or held by the visually impaired user, a plurality of images of the visual content entity;
    notifying, via the augmented reality device, the visually impaired user of availability of the visual content entity and descriptive content associated with the visual content entity, wherein the descriptive content comprises a concept and supplemental content layer that is generated by:
        extracting one or more content elements from the captured images of the visual content entity,
        searching a knowledge database to identify one or more concepts and supplemental content corresponding to the one or more extracted content elements, and
        structuring the one or more concepts and the supplemental content based on their correspondence with the one or more extracted content elements;
    receiving, via the augmented reality device, an indication from the visually impaired user to provide the descriptive content associated with the visual content entity;
    providing, by the augmented reality device, the descriptive content associated with the visual content entity and interactional guidance to the visually impaired user for interacting with the descriptive content;
    tracking, via the augmented reality device, one or more interactions by the visually impaired user with the descriptive content; and
    updating, by the augmented reality device, the interactional guidance provided to the visually impaired user based on the tracking.

2. The method of claim 1, wherein updating the interactional guidance provided to the visually impaired user based on the tracking comprises:
    monitoring, via the augmented reality device, spatial locations of an object associated with the visually impaired user;
    determining whether the monitored spatial locations track one or more spatial locations associated with one or more components of the visual content entity; and
    delivering one or more audio outputs to the visually impaired user, wherein the one or more audio outputs comprises one or more directions for moving the object associated with the visually impaired user.

3. The method of claim 1, wherein:
    the descriptive content associated with the visual content entity comprises a plurality of content layers; and
    the providing the descriptive content associated with the visual content entity and interactional guidance to the visually impaired user for interacting with the descriptive content comprises:
        selecting a first content layer from the plurality of content layers based on an audio input from the visually impaired user, and
        delivering one or more audio outputs corresponding to the selected first content layer to the visually impaired user.

4. The method of claim 1, wherein capturing the plurality of images of the visual content entity comprises:
    capturing, by the augmented reality device, a plurality of first images of the visual content entity;
    determining a quality of the plurality of first images; and
    if the quality of the plurality of first images is less than a quality threshold, delivering one or more audio outputs instructing the visually impaired user to capture a plurality of second images of the visual content entity.

5. The method of claim 1, further comprising, prior to the notifying:
    comparing the captured images with a plurality of reference images stored in a content entity database;
    determining if the captured images match at least one of the reference images;
    if the captured images match at least one of the reference images, obtaining the descriptive content of the matched reference image from the content entity database; and
    if the captured images do not match any one of the reference images, generating descriptive content associated with the visual content entity based on the captured images.

6. The method of claim 1, wherein the descriptive content comprises a plurality of content layers, the content layers comprising the concept and supplemental content layer and one or more of:
    the visual content entity;
    a composition layout layer; or
    a content description layer.

7. The method of claim 6, further comprising generating the composition layout layer, wherein the generating comprises:
    extracting one or more composition sections of the visual content entity, each composition section comprising descriptive content elements associated with the visual content entity;
    determining a spatial location corresponding to each of the one or more extracted composition sections;

ordering the one or more extracted composition sections based on the determined spatial location of each composition section; and including the spatial location corresponding to each extracted composition section in the composition layout layer.

8. The method of claim 6, further comprising generating the content description layer, wherein the generating comprises:

extracting text characters and graphics from the captured images of the visual content entity;

identifying one or more terms from the extracted text characters;

correlating the extracted graphics with one or more of the identified terms;

retrieving one or more definitions of one or more identified terms from a knowledge database; and including the one or more identified terms, the extracted graphics, and the one or more retrieved definitions in the content description layer.

9. A system for assisting a visually impaired user in interacting with a visual content entity, comprising one or more processors and memory storing instructions executable by the one or more processors to cause the system to perform operations comprising:

capturing a plurality of images of the visual content entity;

notifying the visually impaired user of availability of the visual content entity and descriptive content associated with the visual content entity, wherein the descriptive content comprises a concept and supplemental content layer that is generated by:

extracting one or more content elements from the captured images of the visual content entity, searching a knowledge database to identify one or more concepts and supplemental content corresponding to the one or more extracted content elements, and structuring the one or more concepts and the supplemental content based on their correspondence with the one or more extracted content elements;

receiving an indication from the visually impaired user to provide the descriptive content associated with the visual content entity;

providing the descriptive content associated with the visual content entity and interactional guidance to the visually impaired user for interacting with the descriptive content;

tracking one or more interactions by the visually impaired user with the descriptive content; and updating the interactional guidance provided to the visually impaired user based on the tracking.

10. The system of claim 9, wherein updating the interactional guidance provided to the visually impaired user based on the tracking comprises:

monitoring, via the augmented reality device, spatial locations of an object associated with the visually impaired user;

determining whether the monitored spatial locations track one or more spatial locations associated with one or more components of the visual content entity; and delivering one or more audio outputs to the visually impaired user, wherein the one or more audio outputs comprises one or more directions for moving the object associated with the visually impaired user.

11. The system of claim 9, wherein:

the descriptive content associated with the visual content entity comprises a plurality of content layers; and the providing the descriptive content associated with the visual content entity and interactional guidance to the visually impaired user for interacting with the descriptive content comprises:

selecting a first content layer from the plurality of content layers based on an audio input from the visually impaired user, and delivering one or more audio outputs corresponding to the selected first content layer to the visually impaired user.

12. The system of claim 9, wherein capturing the plurality of images of the visual content entity comprises:

capturing, by the augmented reality device, a plurality of first images of the visual content entity;

determining a quality of the plurality of first images; and if the quality of the plurality of first images is less than a quality threshold, delivering one or more audio outputs instructing the visually impaired user to capture a plurality of second images of the visual content entity.

13. The system of claim 9, wherein the instructions further cause the system to perform operations comprising, prior to the notifying:

comparing the captured images with a plurality of reference images stored in a content entity database;

determining if the captured images match at least one of the reference images;

if the captured images match at least one of the reference images, obtaining the descriptive content of the matched reference image from the content entity database; and if the captured images do not match any one of the reference images, generating descriptive content associated with the visual content entity based on the captured images.

14. The system of claim 9, wherein the descriptive content comprises a plurality of content layers, the content layers comprising the concept and supplemental content layer and one or more of:

the visual content entity;

a composition layout layer; or a content description layer.

15. The system of claim 14, wherein the instructions further cause the system to perform operations comprising generating the composition layout layer, wherein the generating comprises:

extracting one or more composition sections of the visual content entity, each composition section comprising descriptive content elements associated with the visual content entity;

determining a spatial location corresponding to each of the one or more extracted composition sections;

ordering the one or more extracted composition sections based on the determined spatial location of each composition section; and including the spatial location corresponding to each extracted composition section in the composition layout layer.

16. The system of claim 14, wherein the instructions further cause the system to perform operations comprising generating the content description layer, wherein the generating comprises:

extracting text characters and graphics from the captured images of the visual content entity;

identifying one or more terms from the extracted text characters;

correlating the extracted graphics with one or more of the identified terms;

retrieving one or more definitions of one or more identified terms from a knowledge database; and including the one or more identified terms, the extracted graphics, and the one or more retrieved definitions in the content description layer.

17. A method for assisting a visually impaired user in interacting with a visual content entity, comprising:

capturing a plurality of images of the visual content entity;

notifying the visually impaired user of availability of the visual content entity and descriptive content associated with the visual content entity, wherein the descriptive content comprises a content description layer that is generated by:

extracting text characters and graphics from the captured images of the visual content, identifying one or more terms from the extracted text characters, correlating the extracted graphics with one or more of the identified terms, retrieving one or more definitions of one or more identified terms from a knowledge database, and including the one or more identified terms, the extracted graphics, and the one or more retrieved definitions in the content description layer;

receiving an indication from the visually impaired user to provide the descriptive content associated with the visual content entity;

providing the descriptive content associated with the visual content entity and interactional guidance to the visually impaired user for interacting with the descriptive content;

tracking one or more interactions by the visually impaired user with the descriptive content; and updating the interactional guidance provided to the visually impaired user based on the tracking.

18. The method of claim 17, wherein the descriptive content comprises a plurality of content layers, the content layers comprising the content description layer and one or more of:

the visual content entity;

a composition layout layer; or a content description layer.

19. The method of claim 17, wherein updating the interactional guidance provided to the visually impaired user based on the tracking comprises:

monitoring spatial locations of an object associated with the visually impaired user;

determining whether the monitored spatial locations track one or more spatial locations associated with one or more components of the visual content entity; and delivering one or more audio outputs to the visually impaired user, wherein the one or more audio outputs comprises one or more directions for moving the object associated with the visually impaired user.

20. The method of claim 17, wherein capturing the plurality of images of the visual content entity comprises:

capturing a plurality of first images of the visual content entity;

determining a quality of the plurality of first images; and if the quality of the plurality of first images is less than a quality threshold, delivering one or more audio outputs instructing the visually impaired user to capture a plurality of second images of the visual content entity.

* * * * *